(12) United States Patent
Huang et al.

(10) Patent No.: US 11,745,347 B2
(45) Date of Patent: Sep. 5, 2023

(54) METHOD FOR ASSESSING THE QUALITY OF A ROBOTIC GRASP ON 3D DEFORMABLE OBJECTS

(71) Applicant: NVIDIA Corp., Santa Clara, CA (US)

(72) Inventors: Isabella Huang, Berkeley, CA (US); Yashraj Shyam Narang, Seattle, WA (US); Clemens Eppner, Seattle, WA (US); Balakumar Sundaralingam, Milpitas, CA (US); Miles Macklin, Auckland (NZ); Tucker Ryer Hermans, Salt Lake City, UT (US); Dieter Fox, Seattle, WA (US)

(73) Assignee: NVIDIA CORP., Santa Clara, CA (US)

( * ) Notice: Subject to any disclaimer, the term of this patent is extended or adjusted under 35 U.S.C. 154(b) by 206 days.

(21) Appl. No.: 17/207,200

(22) Filed: Mar. 19, 2021

(65) Prior Publication Data

US 2022/0297297 A1 Sep. 22, 2022

(51) Int. Cl.
*B25J 9/16* (2006.01)
*B25J 13/08* (2006.01)

(52) U.S. Cl.
CPC ........... *B25J 9/1669* (2013.01); *B25J 9/1612* (2013.01); *B25J 9/1671* (2013.01); *B25J 13/082* (2013.01); *B25J 13/085* (2013.01)

(58) Field of Classification Search
CPC ...... B25J 9/1669; B25J 9/1612; B25J 9/1671; B25J 13/082; B25J 13/085; G05B 2219/39469; G05B 2219/40515
See application file for complete search history.

(56) References Cited

U.S. PATENT DOCUMENTS

| 9,014,857 | B2 | 4/2015 | Ota et al. |
| 9,073,208 | B2 * | 7/2015 | Chung .................. B25J 9/1612 |
| 9,440,353 | B1 | 9/2016 | Silva et al. |
| 9,671,777 | B1 * | 6/2017 | Aichele ................ B25J 9/1666 |
| 10,093,019 | B1 | 10/2018 | Silva et al. |
| 10,099,369 | B2 | 10/2018 | Kopicki |
| 10,275,543 | B1 * | 4/2019 | Edsinger ................ G06F 30/00 |
| 10,335,947 | B1 | 7/2019 | Diankov et al. |
| 10,500,735 | B1 * | 12/2019 | Menon ................ B25J 15/0475 |
| 10,532,462 | B1 | 1/2020 | Diankov et al. |
| 10,569,417 | B1 | 2/2020 | Diankov |

(Continued)

FOREIGN PATENT DOCUMENTS

WO WO-2018092254 A1 * 5/2018 ............. B25J 13/00

OTHER PUBLICATIONS

Zaidi et al., Grasp Planning Pipeline for Robust Manipulation of 3D Deformable Objects with Industrial Robotic Hand + Arm Systems 2020, MDPI.*

(Continued)

*Primary Examiner* — Adam R Mott
*Assistant Examiner* — Sagar Kc
(74) *Attorney, Agent, or Firm* — Rowan TELS LLC

(57) ABSTRACT

Candidate grasping models of a deformable object are applied to generate a simulation of a response of the deformable object to the grasping model. From the simulation, grasp performance metrics for stress, deformation controllability, and instability of the response to the grasping model are obtained, and the grasp performance metrics are correlated with robotic grasp features.

18 Claims, 21 Drawing Sheets

(56) References Cited

U.S. PATENT DOCUMENTS

| | | | |
|---|---|---|---|
| 10,696,493 | B1 | 6/2020 | Diankov et al. |
| 10,981,272 | B1* | 4/2021 | Nagarajan .............. B25J 9/1669 |
| 2010/0156127 | A1* | 6/2010 | De Kervanoael .... B25J 15/0253 |
| | | | 901/46 |
| 2013/0184869 | A1* | 7/2013 | Inazumi ................. B25J 9/1633 |
| | | | 700/260 |
| 2017/0165832 | A1* | 6/2017 | Wettels ................... G01L 5/226 |
| 2019/0030714 | A1* | 1/2019 | Knopf ...................... B25J 15/02 |
| 2019/0160678 | A1 | 5/2019 | Zhang et al. |
| 2019/0168397 | A1* | 6/2019 | Ikeda ..................... B25J 9/1664 |
| 2019/0196436 | A1* | 6/2019 | Nagarajan ............... B25J 9/163 |
| 2021/0394360 | A1* | 12/2021 | Hwang ............... B25J 15/0009 |

OTHER PUBLICATIONS

NPL_6-DOF GraspNet: Variational Grasp Generation for Object Manipulation_Mousavian et al.
NPL_Multi-Fingered Grasp Planning via Inference in Deep Neural Networks_Lu et al.
NPL_Robotic Grasping of Novel Objects using Vision_Saxena et al.
NPL_The Dexterity Network_Mahler et al.

\* cited by examiner

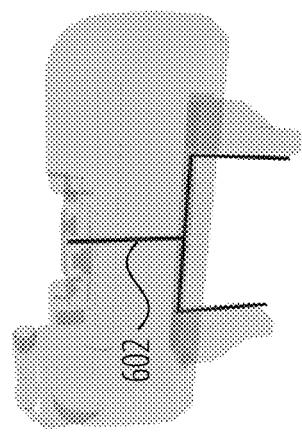
FIG. 6C
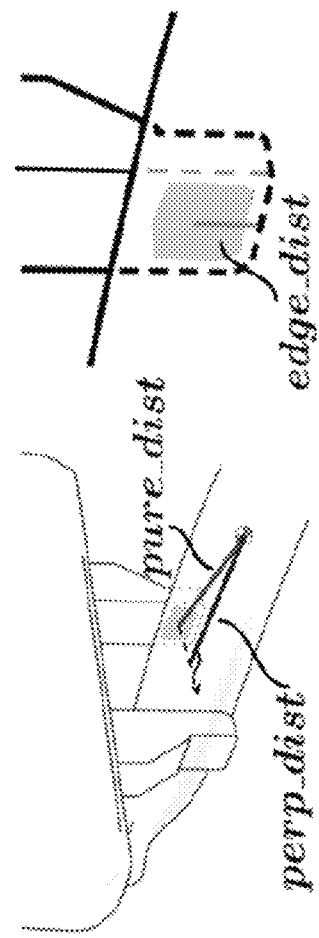
FIG. 6B
FIG. 6A

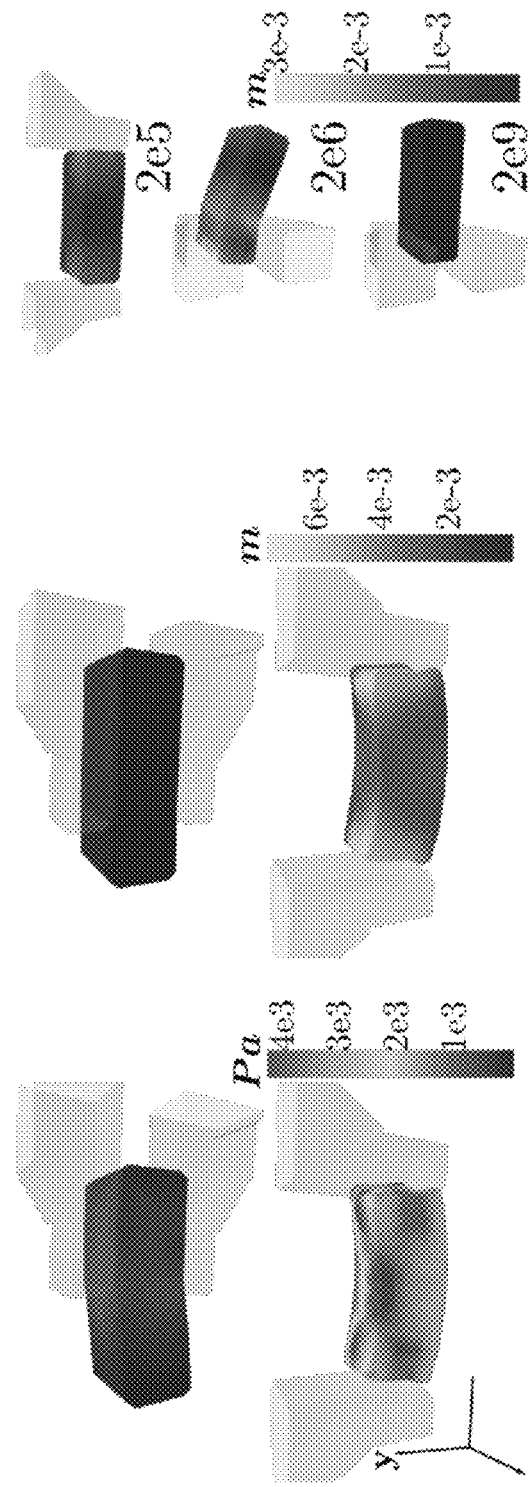

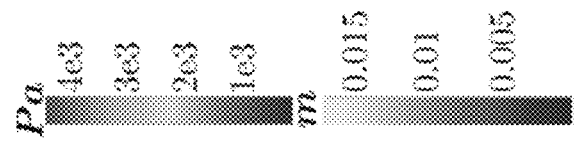
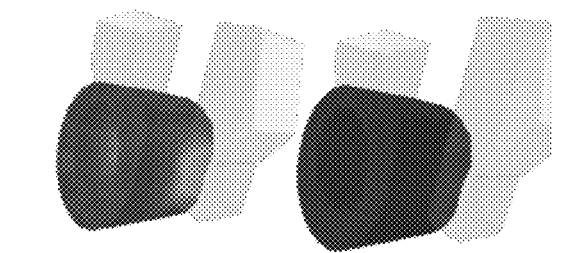
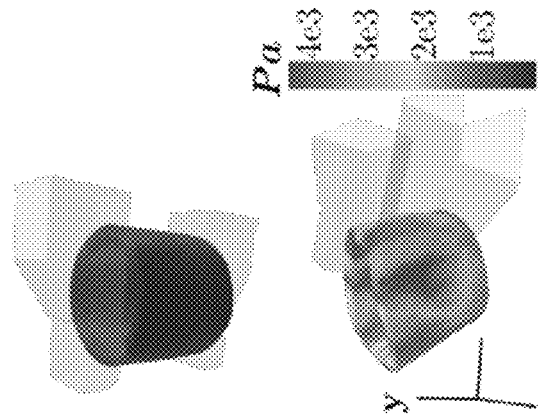
FIG. 10C
FIG. 10B
FIG. 10A

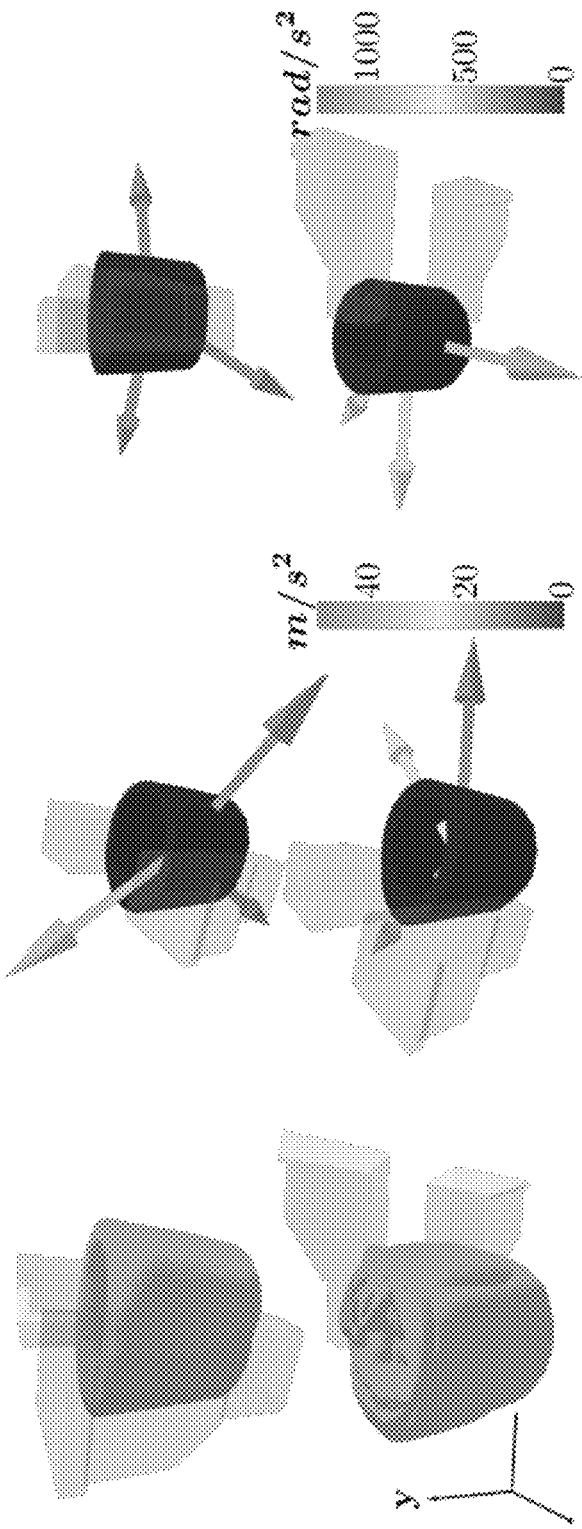

METHOD FOR ASSESSING THE QUALITY OF A ROBOTIC GRASP ON 3D DEFORMABLE OBJECTS

BACKGROUND

Robotic grasping of deformable objects is utilized in applications such as robotic surgery, food handling, and domestic tasks (e.g., picking up soft objects from the floor). Grasp strategies for deformable objects and rigid objects are distinct, and grasp strategies may also vary between different types of deformables themselves. The grasp location (where contact is made between the robotic grasper and the object) for a deformable object affects how its shape changes under gravity and manipulation.

Three dimensional (3D) deformable objects are objects for which all spatial dimensions are significant in the grasping strategy and for which substantial material deformation may occur in all three dimensions. Fresh fruits, organs, and flexible containers meet these criteria, whereas simpler objects like cloth and rope do not.

Current approaches tend to utilize heuristics (analytical equations) to determine grasping strategies on 3D deformable objects. Developing analytical equations for grasping such objects tends to be complex and computationally expensive. Performing real-world experiments may also be expensive and/or dangerous. For at least these reasons it is helpful to apply simulation to the problem of grasping 3D deformable objects with robots. However, simulating the grasping of such objects has proven to be challenging.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6A and FIG. 6B depict four exemplary grasp features (perpendicular distance, pure distance, edge distance, and gravity alignment) of a Franka robotic grasper.

FIG. 6C depicts a line representation 602 of a Franka robotic grasper pose.

FIG. 7A depicts low (top depiction) and high (bottom depiction) von Mises stresses in a prism-shaped object, for a modulus E=2e4.

FIG. 7B depicts deformation field norms in the same object for E=2E4.

FIG. 7C depicts high deformation grasp models for additional moduli.

FIG. 10A depicts maximum stress for two different grasp models on a cup-shaped object, for E=2e4.

FIG. 10B depicts maximum deformation for the grasp models of FIG. 10A.

FIG. 10C depicts a grasp model in which contact is made at the base of the cup-shaped object of FIG. 10A.

FIG. 11A depicts deformation controllability for two different grasp models on a cup-shaped object, for E=2e4.

FIG. 11B depicts linear instability for the grasp models of FIG. 11A.

FIG. 11C linear instability for the grasp models of FIG. 11A.

DETAILED DESCRIPTION

Figure 1:
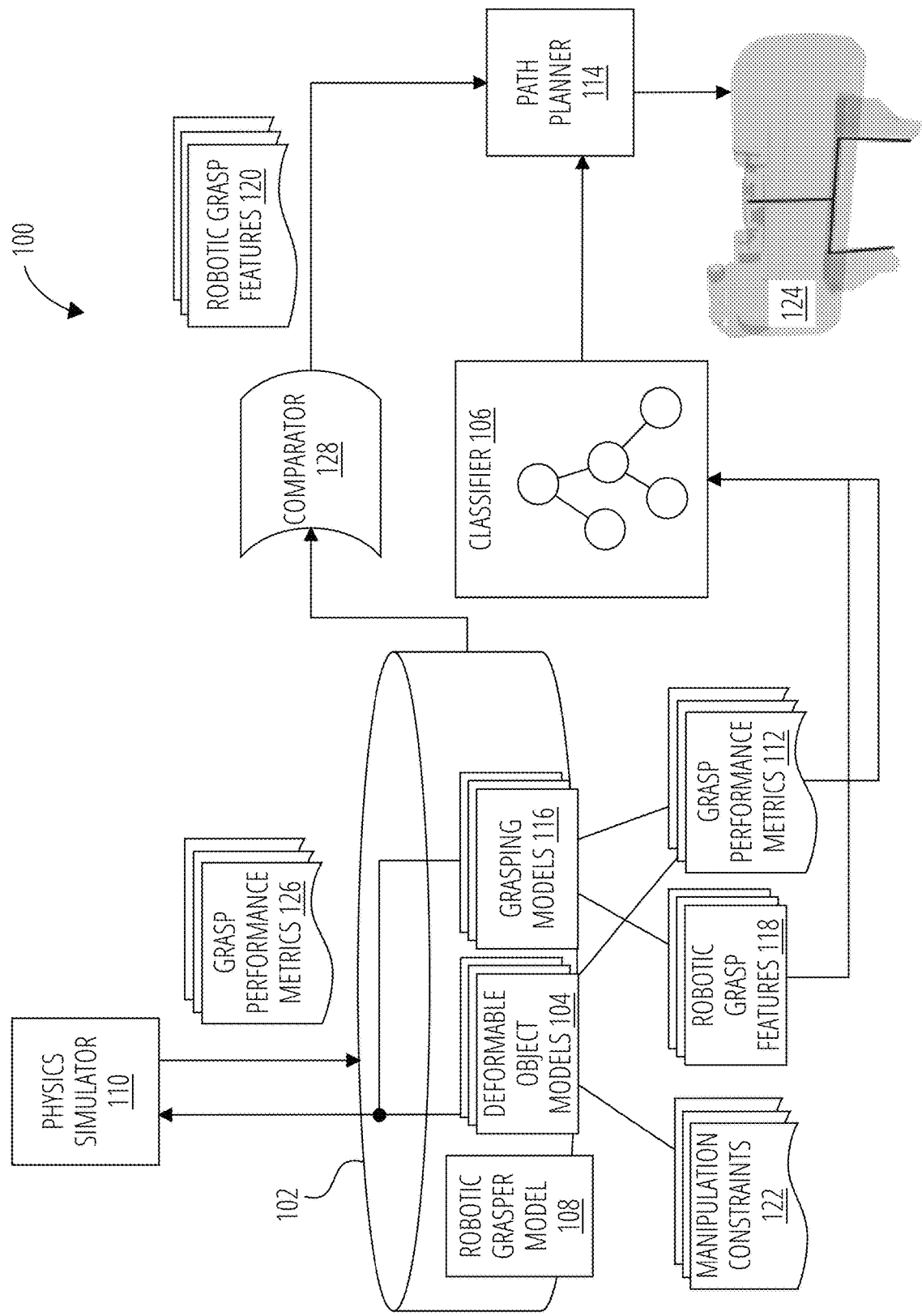
FIG. 1 depicts a robotic grasper path planning system 100 in accordance with one embodiment.

The disclosed techniques utilize a focused set of robotic grasp features (e.g., robotic grasper squeezing distance, contact patch area . . . ) that may be accurately measured with practical commercial sensors. Grasp performance metrics are generated utilizing a (e.g., tetrahedral) mesh representation of an object (an object model) and a set of candidate grasp object models for simulation. Robotic grasp outcomes from the simulations are quantified by metrics such as stress, deformation, and stability. Grasp performance metrics may also compete with one another for importance/dominance for particular object categories (e.g., shapes) per metric. For example a stable grasp may induce high deformation a particular object category. In one embodiment, GPU-based Finite Element Method simulation is utilized to efficiently simulate a robust set of robotic grasp object models on diverse object categories and to quantify (via metrics) a quality of the grasp object models.

The Finite Element Method (FEM) is a variational numerical technique that divides geometrical domains of an object model into less complex sub-regions and solves the weak form of the governing partial differential equations over each region. In FEM simulation, a deformable object may be represented as an object model by a volumetric mesh of elements. The object's configuration is described by the element vertices, i.e. nodes. One embodiment utilizes a co-rotational linear constitutive model of the object's internal dynamics coupled to a rigid body representation of a robotic grasper via an isotropic Coulomb contact model. Implicit integration may be performed by solving the resulting nonlinear complementarity problem with a Newton solver. At each timestep, the simulator returns element stress tensors and nodal positions, which are applied to calculate grasp performance metrics. The accuracy of FEM predictions for object deformations improves as the time step size is decreased and/or the mesh density is increased.

In one exemplary embodiment a set of 3D deformable objects comprising both simple object primitives and complex real-world models is categorized by geometry and dimension. Object surface meshes are preprocessed to smooth sharp edges and reduce node count, and then converted into watertight tetrahedral meshes. The object models may be formed with a homogeneous density, e.g., 1000 kg/m$^3$ (±250 kg/m$^3$), a Poisson's ratio of 0.3 (e.g., ±0.1), a coefficient of friction of 0.7 (e.g., ±0.3), and a Young's modulus of {2e4, 2e5, 2e9} Pa. These moduli represent a wide range of real materials, from human skin (~10$^4$ Pa) to ABS plastic (~10$^9$ Pa). In one embodiment a simulation frequency of 1500 Hz may be used.

In one embodiment a set of grasp performance metrics is generated comprising grasp success, stress, deformation, strain energy, linear and angular instability, and deformation controllability.

Grasp success is a binary (e.g., true, false) metric indicating whether an object is successfully lifted from a support plane or not. Stress is the element-wise stress distribution of an object when picked up. Exceeding material stress thresholds (e.g., yield stress, ultimate stress) leads to permanent deformation, damage, or fracture. Examples include creasing of boxes, bruising of fruit, cracking of plastic, and perforation of internal organs. Each element's stress tensor may be transformed into von Mises stress, a scalar quantity that quantifies whether an element has exceeded its yield threshold. Several summary statistics (e.g., mean, median) may be computed for a von Mises stress distribution over all elements. One embodiment measures the maximum von Mises stress due to real-world constraints for a plurality of scenarios to avoid damage to objects being manipulated.

Deformation characterizes the node-wise displacement field of the object from pre- to post-pickup, neglecting rigid-body transformations. In many applications deformation should be minimized or kept below the threshold level. This is the case for example when manipulating flexible containers with contents that can be damaged or dislodged. To compute this field, the difference between the pre- and post-pickup nodal positions is calculated, and the closest rigid transform is determined and subtracted. In one embodiment the node-wise l$^2$ norm is computed. As done for the stress field, the maximum value of the field may be determined.

Strain energy is the elastic potential energy stored in the object (analogous to a Hookean spring). This metric penalizes both stress and deformation. The strain energy is given by $U_e = \int_V \sigma^T \varepsilon dV$, where $\sigma$, $\varepsilon$, and V are the stress tensor, strain tensor, and volume, respectively.

Stability (and instability) in this case refers to the minimum acceleration for a robotic grasper at which the object loses contact, i.e., separates along the robotic grasper normal, or slides out of the robotic grasper. This measures how easily an object is displaced from a grasp under external wrenches. Linear and angular instability are evaluated by steadily increasing acceleration of the robotic grasper along or about a set of (e.g., 16) vectors regularly spaced in a unit 2-sphere. Each vector has a complement pointing in the opposite direction; thus, this method may be understood to generalize cyclic shaking tests. For each vector, the loss-of-contact threshold is determined, and the minimum over the vectors is then determined.

Deformation controllability herein refers to the maximum deformation when the object is reoriented under gravity. See for example FIG. 5. Depending on the gripping application, it may be useful to either reduce (e.g., minimize) or increase (e.g., maximize) deformation controllability. For example, to decouple grasping and manipulation, it may be desirable to minimize deformation controllability, causing the object to behave rigidly after pickup. Alternatively, to facilitate shape change, it may be advantageous to maximize deformation controllability. In endoscopy, for instance, a precise geometry of the internal tract may or may not be known. A manipulator may grasp the endoscope closer to its base to allow it to flexibly deform during insertion. The notion of deformation controllability utilized here differs from the conventional meaning in robotics of the ability to achieve all robot states in finite time. Here robot controllability is not modified by changing actuation. Instead object controllability is modified by changing the number of possible deformation states.

In one embodiment the robotic grasp features comprise seven metrics that partially encode the performance metrics. These features may be determined/applied before the robotic grasper picks up the object, but after applying the desired grasping force with the robotic grasper. This focused set of features is amenable to measurement by a common set of sensors (e.g., encoders for grasper finger displacement, depth cameras for coarse geometry, and tactile sensors for contacts). In one embodiment, the utilized robotic grasp features are pure distance, perpendicular distance, number of contacts, edge distance, squeeze distance, robotic grasper separation, and gravity alignment. See for example FIG. 6A-FIG. 6C.

Pure distance refers to the distance from the center of each robotic grasper finger's contact patch to the object's center of mass (COM), averaged over the number of fingers. Perpendicular distance is the average of the perpendicular distance from the center of each finger's contact patch to the COM. Number of contacts refers to the number of object nodes in contact with each finger, averaged over the number of fingers. Edge distance is the distance from each finger's distal edge to the center of its contact patch, averaged over the number of fingers. Squeeze distance is the change in finger separation from initial contact to the point at which the target force is achieved. Robotic grasper separation is the finger separation when applying the target force. Gravity alignment is the angle between the finger normal and the global vertical; references the grasp pose with respect to a global frame.

In one embodiment, a set of objects is formed for manipulation by a simulated robotic grasper, e.g., a Franka parallel-jaw robotic grasper. Each object is initially at rest atop a horizontal plane. Robotic grasper collisions with the plane are disabled in order to simulate the full spatial distribution of grasps. For each object, a diverse set of candidate grasps are generated on an aligned bounding box using an antipodal sampler. At the beginning of each grasp, the pre-contact nodal positions and element stresses of the object are recorded. The robotic grasper is then initialized at one of the candidate grasp poses. A desired squeezing force is generated, e.g., $$F_p = 1.3 \times \frac{mg}{u}$$

(where m, g, and u are the mass, gravitational constant, and friction coefficient), corresponding to the frictional force required to support the object's weight, multiplied by a safety factor. The robotic grasper is closed by applying a force-based torque controller, with a low-pass filter applied to contact forces to mitigate numerical fluctuations. The grasp features are recorded once $F_p$ converges before lifting. Tests for pickup, reorientation, linear acceleration, and angular acceleration are then executed depending on the performance metric to be evaluated.

For a pickup test, the platform is lowered to apply incremental gravitational loading to the object. Pickup success is computed as whether contact is broken between the object and the platform for a configured number (e.g., five) seconds. If the object is successfully picked up, stress and deformation fields are recorded, and stress, deformation, and strain energy performance metrics are computed.

For a reorientation test, the robotic grasper squeezing force is increased from $F_p$ to $F_{slip}$, the maximum force required to counteract rotational slip. $F_{slip}$ is estimated by approximating each robotic grasper contact patch as a number (e.g., two) point-contacts that oppose the moment induced by gravity. The platform then lowers until the object is picked up. The robotic grasper rotates the object about each of a configured number (e.g., sixteen) vectors at configured angles, e.g., $$\frac{k\pi}{4},$$

k∈[1 ... 4] to test a total set (e.g., 64) of unique reorientation states. Stress and deformation fields are recorded for each, and the deformation controllability metric is computed as the maximum deformation over all states.

For a linear acceleration test, the robotic grasper translates along each of the vectors at a configured jerk, e.g., $$1000 \frac{m^3}{s}$$

jerk, in a gravity-tree environment, corresponding to a linearly increasing acceleration. The acceleration is recorded at which at least one finger loses contact with the object, with a configured limit, e.g., $$50 \frac{m^2}{s}$$

(≈5 g, a realistic upper bound). The linear instability metric is then calculated as the average loss-of-contact acceleration over all vectors.

For an angular acceleration test, the robotic grasper rotates about each of the vectors at a configured jerk, e.g., $$2500 \frac{rad^3}{s}$$

jerk, to mitigate undesired linear acceleration. The center of rotation is defined as the midpoint between the fingers. The angular acceleration is recorded at which at least one finger loses contact with the object, with a configured limit, e.g., $$1000 \frac{rad^2}{s}$$

(i.e., the linear acceleration limit, scaled by the 0.04 m maximum finger displacement, which approximates the moment arm). The angular instability metric is calculated as the average loss-of-contact acceleration over all vectors.

FIG. 1 depicts a robotic grasper path planning system 100 in one embodiment. A physics simulator 110 receives a robotic grasper model 108 and deformable object models 104 from a storage system 102. The physics simulator 110 also receives grasping models 116 to apply to the robotic grasper model 108 and deformable object models 104. The physics simulator 110 simulates effects of the various grasping models 116 on the various deformable object models 104 to generate grasp performance metrics 126 that are associated in the storage system 102 with a corresponding one of the deformable object models 104 and grasping models 116. The stored grasp performance metrics 112 and robotic grasp features 118 are input to a classifier 106 that generates a measure of correlation between them.

A deformable object model may be selected having characteristics that resemble a physical deformable object (not depicted) that is to be manipulated in some application by a robotic grasper. Manipulation constraints 122 for the physical object may be determined (in the form of grasp performance metrics), for example based on a shape category of the object (object category), the material the object is made from, its weight, and so on, and provided to a comparator 128 that ascertains the robotic grasp features 118 most highly correlated to the manipulation constraints 122. "Object category" or "object class" refers to defined shape classifications to which objects and object models are associated. In one embodiment, certain manipulation constraints 122 are given higher weight or dominance in this determination, based on attributes of the object. The importance of various metrics based on object attributes is discussed in more detail below.

Robotic grasp features 120 correspond to the robotic grasp features 118 for one of the grasping models 116 best meeting the manipulation constraints 122 may selected and applied to the path planner 114 for a robotic grasper 124 to be utilized on the physical object in the application. Non-limiting examples of robotic path planners are Dex-Net and 6-DOF Graspnet, and other point-cloud and variational algorithms known in the art. In some embodiments the selected robotic grasp features are applied as initial settings for the path planner and/or robotic grasper on where and/or how to grasp the deformable object.

The physics simulator 110 may be any one or more of a great many open source or proprietary physics/FEM simulators well known to those of ordinary skill in the art. One example physics simulator 110 that may be utilized is the "Isaac Gym" system provided by Nvidia Corporation.

The storage system 102 may be any non-transitory computer readable medium, e.g., a hard drive, optical drive, solid-state memory, network storage system, cloud storage system, and so on. The classifier 106 may be a random forest classifier, perceptron classifier (e.g., based on one or more deep neural network), statistical classifier (e.g., utilizing Support Vector Machine), ablation techniques, logistic regression, naive bayes nets, linear regression, Gaussian processes, and so on, all of which have numerous implementations and algorithms well known and available in the art. Given the grasp performance metrics 112 and desired classifications (robotic grasp features 120), such classifiers may be trained or otherwise configured to make the transformation using well-known techniques in the art.

The comparator 128 may be implemented using any of a family of known techniques for comparing, for example, two or more vectors (e.g., a vector comprising the robotic grasp features and a the manipulation constraints).

The path planner 114 may be any path planning logic for a robotic manipulator. Examples include families of grid-based algorithms, interval-based algorithms, geometric algorithms, potential field algorithms, and sampling-based algorithms, all well-known and available in the art.

In one embodiment, for each shape class of a particular elastic modulus (E), a number N (e.g., 7) of robotic grasp features and a number M (e.g., 7) of grasp performance metrics are evaluated for each of a set of grasping models. The predictive power of the robotic grasp features to predict the grasp performance metrics is then evaluated. For each continuous-valued grasp performance metrics (i.e., all metrics except pickup success), a classifier is configured, e.g., a random forest classifier. The classifier takes as input the robotic grasp features and outputs whether the corresponding grasping model belongs to the top or bottom $x^{th}$ (e.g., $30^{th}$) percentile of all grasping models, ranked by their grasp performance metric values. Random forests classifiers may be advantageous due to their ability to handle relatively small training sets compared to other classifiers (e.g., perceptrons), as well as their prior successes in the field in predicting grasp object model outcomes.

In one embodiment, the predictive power of each robotic grasp feature is quantified by its Gini impurity-based importance. In one embodiment, for each performance metric, a separate classifier is trained for each modulus E; however, the relative feature importance may be sufficiently qualitatively similar over all moduli that robotic grasp features across all E may be utilized to train one classifier per metric per shape class and simply add E as a feature.

In some implementations, for prism-shaped objects the pure distance feature may be assigned the highest importance or dominant status among the grasp performance metrics. For spheroid-shaped objects this may also be the case. Perpendicular distance is an additional important feature for angular instability on prism-shaped objects, and is the most important robotic grasp feature for spheroid-shaped objects. Rotational perturbations are centered between the tips of the robotic grasper, and perpendicular distance directly captures the length of the moment arm. See for example FIG. 7A-FIG. 8C.

Between prism-shaped objects and spheroid-shaped objects, an influential difference may be that the pickup success rate for spheroids drops dramatically over a certain modulus range, e.g., from around 90% at E=2e6 to around 12% at E=2e9. The ring-, cup-, and cylinder-shaped objects may also experience a drop in pickup success at high E values. When these rounded objects are stiff, the robotic grasper becomes unable to induce deformation and generate sufficient contact area upon squeezing, driving the object out of the robotic grasper fingers. See for example FIG. 9A-FIG. 9C.

For cup-shaped objects, gravity alignment may be assigned the highest importance/dominance for predicting maximum stress. Robotic grasps with the lowest maximum stress may be top-bottom grasps. In addition, squeeze distance may be assigned high or dominant important for predicting maximum deformation in cup-shaped objects. As the robotic grasper squeezes the object, this feature directly characterizes the stiffness of the material between the fingers. In contrast to prism- and spheroid-shaped objects, perpendicular distance may have substantially higher influence than pure distance in predicting deformation controllability and instability of cup-shaped objects. When the robotic grasper squeezes the cup, perpendicular distance may stably measure of the distance between the robotic grasper and the opening of the cup, which is influential for deformation controllability and stability. However, pure distance changes substantially regardless of how far the robotic grasper is from the opening. See for example FIG. 10A-FIG. 11C.

For ring-shaped objects, gravity alignment may be assigned dominant importance for predicting deformation-related metrics. Although the deformations induced by side grasps on a cup-shaped object vary based on height of the cup (i.e., side grasps at the base induce less deformation than at the opening), side grasps on ring-shaped objects may induce high deformation. Thus, the grasps with the lowest and highest values for deformation-related metrics may be best distinguished by whether they are top-bottom or side grasps, and gravity alignment captures this aspect. In addition, edge distance and number of contacts may be assigned high influence for predicting deformation controllability in ring-shaped objects. The amount of material squeezed by the robotic grasper may highly influence deformation controllability in ring-shaped objects. This quantity depends on both edge distance (distance between contact patch and robotic grasper finger edge) and number of contacts (contact area). As with cup-shaped objects, perpendicular distance may be assigned dominant status for predicting linear and angular instability for ring-shaped objects. See for example FIG. 12A-FIG. 13B.

For flask-shaped objects, robotic grasper separation may be assigned dominance for predicting maximum stress. As with the ring-shaped objects, the grasping models with the lowest and highest stress are distinguished by whether they are top-bottom or side grasps. In addition, as with the cup-shaped objects, squeeze distance may be dominant for predicting deformation Finally, edge distance may be dominant for predicting linear and angular instability. This feature quantifies the physical displacement required for the object to lose contact with the robotic grasper. For cylinder-shaped objects, edge distance may be dominant for predicting maximum stress and deformation. For cylinders, this robotic grasp feature quantifies how strongly the grasp pinches the ends or middle of the object. In addition, pure distance and perpendicular distance are highly correlated (R=0.99); candidate grasps squeeze perpendicular to the long axis of the cylinder, resulting in nominal difference between the two features in many/all grasping models. These features are dominant for predicting deformation controllability. They quantify the distance of the robotic grasper to the ends of the object, determining the moment arm for bending. See for example FIG. 14A-FIG. 14E.

In one embodiment the dimensionality of the robotic grasp features evaluated by the comparator 128 may be reduced to a single dominant feature for each grasp performance metric for a particular object category. For example, for the maximum stress metric of cylinder-shaped objects, edge distance may be dominant. Where a dominant feature is correlated with a performance metric, it may be assumed the feature-metric pair is also correlated on unknown objects geometrically similar to the associated object type. For example, if edge distance and maximum stress are correlated among grasps on a cylinder-type objects, they may be assumed to also be correlated for grasping models on a banana, which is cylinder-like. Grasping models may be ranked according to the value of the grasp feature and this ranking may be applied as a direct prediction of the rank of the grasping models according to the value of the performance metric.

Figure 2:
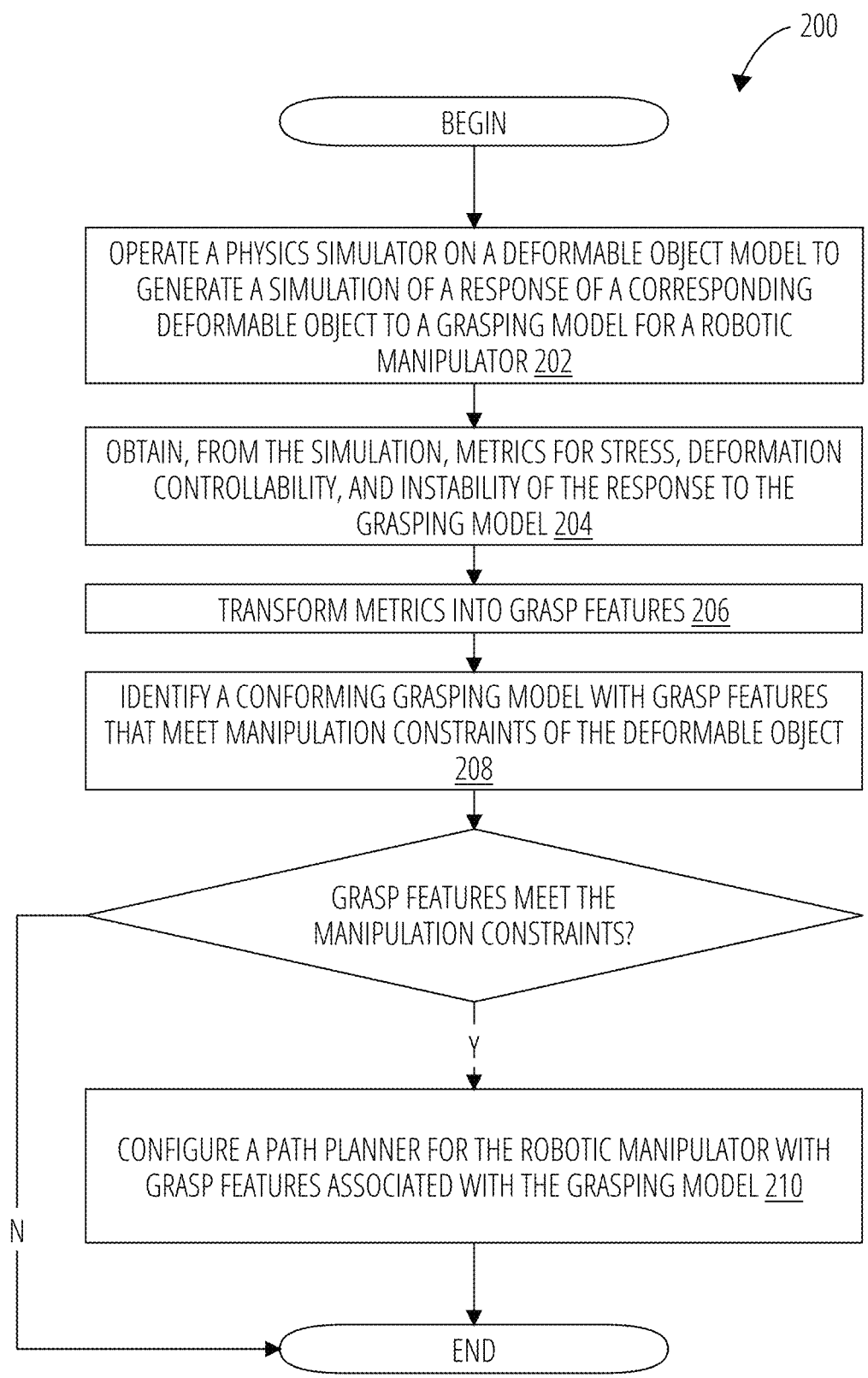
FIG. 2 depicts a process 200 for configuring control settings of a robotic manipulator path planner in accordance with one embodiment.

FIG. 2 depicts a process 200 for configuring a robotic manipulator path planner in one embodiment. In block 202, a physics simulator in operated on a deformable object model to generate a simulation of a response of the deformable object model to a grasping model for the robotic manipulator. In block 204, grasp performance metrics are obtained from the simulation for stress, deformation, controllability, and instability of the response to the grasping model. In block 206, the grasp performance metrics are transformed into robotic grasp features. In block 208, it is determined whether a conforming model (of the grasping models) comprises robotic grasp features that meet manipulation constraints of the deformable object. In block 210, if (on condition that) the robotic grasp features from the simulation meet the manipulation constraints, a path planner for the robotic manipulator is configured with grasp settings associated with the grasping model.

In one embodiment, a system to carry out the process 200 includes a plurality of deformable object models. The system also includes a physics simulator. The system includes logic to operate the physics simulator on (one or more) deformable object model of the deformable object models to generate a simulation of a response of the deformable object model to a grasping model for a robotic manipulator, and to obtain, from the simulation, metrics for stress, deformation, controllability, and instability of the response to the grasping model. The system further includes logic to determine whether there are conforming grasping models that meet manipulation constraints of the deformable object. If a grasping model is identified that meets the manipulation constraints, a path planner for the robotic manipulator is configured with robotic grasp features associated with the conforming grasping model.

Figure 3:
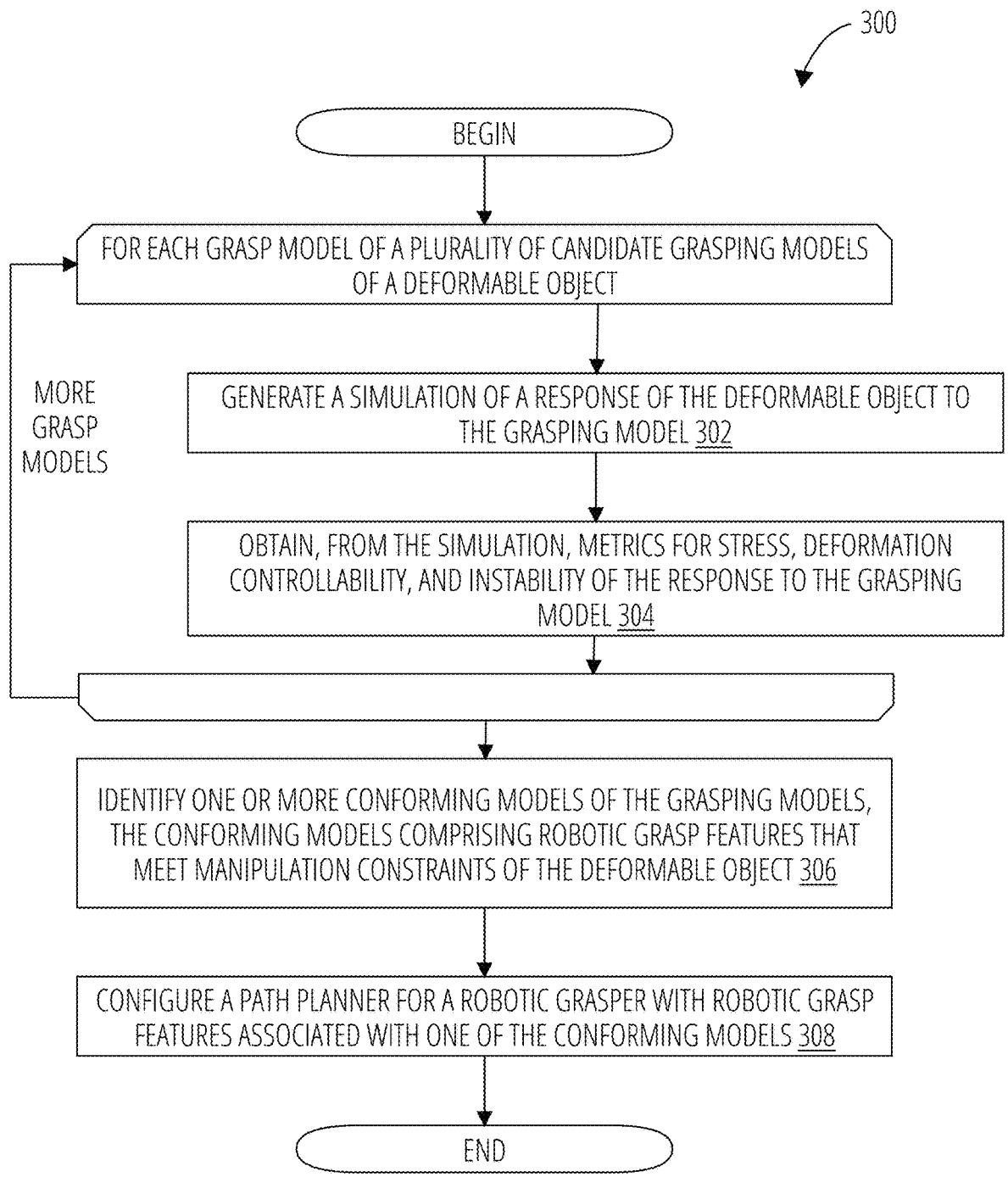
FIG. 3 depicts a process 300 for configuring control settings in a robotic grasper in accordance with one embodiment.

FIG. 3 depicts a process 300 for configuring control settings in a robotic grasper in one embodiment. For each grasps model of a plurality of candidate grasping models of a deformable object, a simulation (block 302) is generated of a response of the deformable object to the grasping model. In block 304, metrics are obtained from the simulation for stress, deformation, controllability, and instability of the response to the grasping model. In block 306, one or more conforming models of the grasping models are identified. One or more conforming models comprising robotic grasp features that meet manipulation constraints of the deformable object is identified and at block 308, the robotic grasper is configured by applying the robotic grasp features of one of the conforming models.

Figure 4:
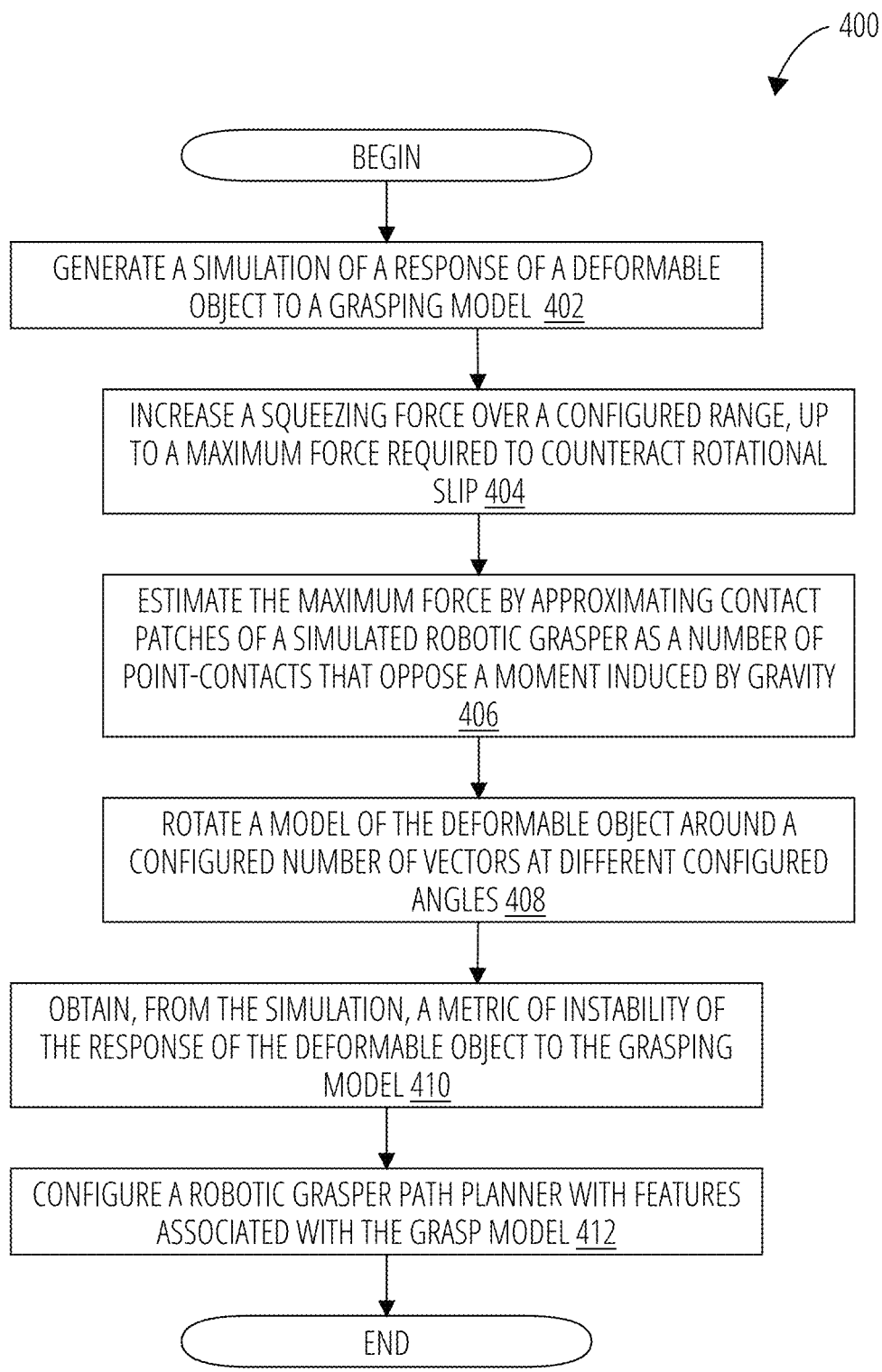
FIG. 4 depicts a process 400 for configuring control settings in a robotic grasper in accordance with one embodiment.

FIG. 4 depicts a process 400 for configuring control settings in a robotic grasper in accordance with one embodiment. In block 402, process 400 a simulation of a response of a deformable object to a grasping model is generated by increasing a squeezing force over a configured range, up to a maximum force required to counteract rotational slip (block 404), wherein the maximum force is estimated by approximating each contact patch of a simulated robotic grasper as a number of point-contacts that oppose a moment induced by gravity (block 406). The simulation rotates a model of the deformable object around a configured number of vectors at configured angles (block 408) and a metric of instability of the response of the deformable object to the grasping model (block 410). In block 412, a robotic grasper path planner is configured based on the robotic grasp features associated with the grasp model.

In one embodiment, a computing apparatus to carry out the process 300 and/or process 400 includes at least one processor (e.g., one or more general purpose data processor and one or more graphics processing unit). The computing apparatus also includes a memory storing instructions that, when executed by the at least one processor, configure the apparatus to generate a simulation of a response of a deformable object to a grasping model by increasing a squeezing force of a simulated robotic grasper on a deformable object model representing the deformable object over a configured range, up to a maximum force required to counteract rotational slip of the simulated robotic grasper, where the maximum force is estimated by approximating one or more contact patch of the simulated robotic grasper as a number of point-contacts that oppose a moment induced by gravity. The apparatus may rotate the deformable object model around a configured number of different vectors at different configured angles. The computing apparatus also includes instructions that, when executed by the at least one processor, configure the apparatus to obtain, from the simulation, a metric of instability under deformation of the response of the deformable object model to the grasping model and to apply this metric to identify robotic grasp features for a path planner of a robotic grasper.

Figure 5:
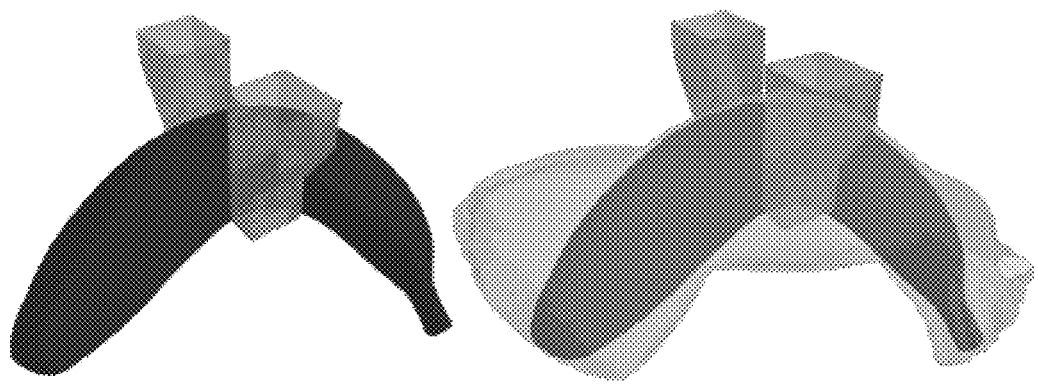
FIG. 5 illustrates an example of deformation controllability.

FIG. 5 illustrates an example of deformation controllability. The left illustration depicts a banana under pickup by a robotic grasper. The right illustration depicts a union of banana configurations achieved under reorientation, superimposed. The "smearing" of configurations on the right illustration indicates potentially low deformation controllability.

In the various depictions that follow, darker shading indicates a lower value of a metric.

FIG. 6A and FIG. 6B depict four exemplary grasp features (perpendicular distance, pure distance, edge distance, and gravity alignment) of a Franka robotic grasper. FIG. 6C depicts a line representation 602 of a Franka robotic grasper pose.

FIG. 7A depicts low (top depiction) and high (bottom depiction) von Mises stresses in a prism-shaped object, for a modulus E=2e4. FIG. 7B depicts deformation field norms in the same object. FIG. 7C depicts high deformation grasp models for other moduli.

Figure 8A:
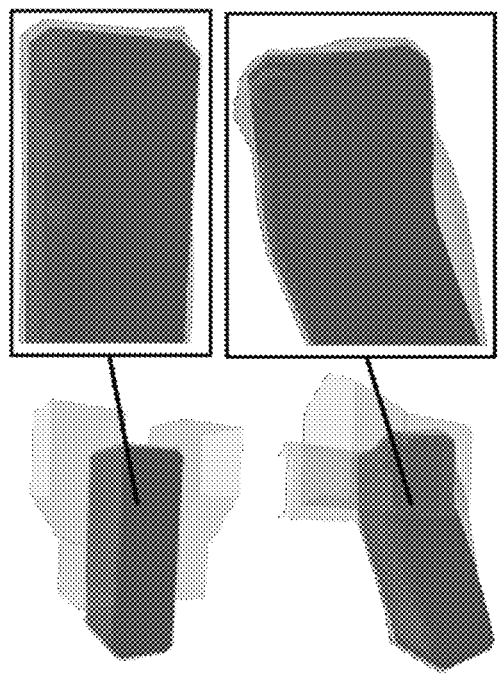
FIG. 8A depicts deformation controllability for two different grasping models on a prism-shaped object with E=2e4.
Figure 8B:
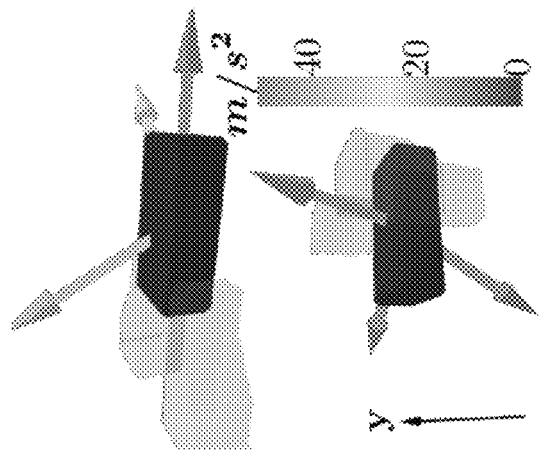
FIG. 8B depicts linear instability for the grasping models of FIG. 8A.
Figure 8C:
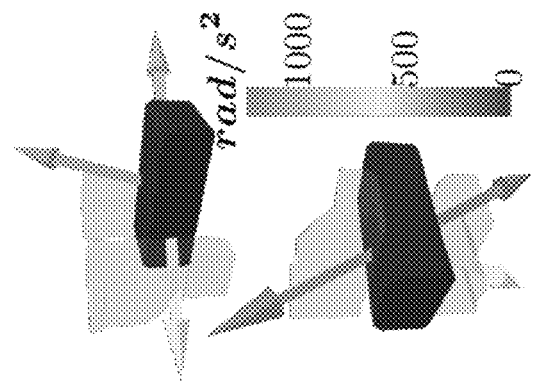
FIG. 8C depicts angular stability for the grasping models of FIG. 8A.

FIG. 8A depicts deformation controllability for two different grasping models on a prism-shaped object with E=2e4. The smearing depicts a union of configurations under reorientation. FIG. 8B depicts linear instability for the grasping models of FIG. 8A. FIG. 8C depicts angular stability for the grasping models of FIG. 8A. The depicted vectors correspond to the maximum, minimum, and median accelerations at grasp failure.

Figure 9A:
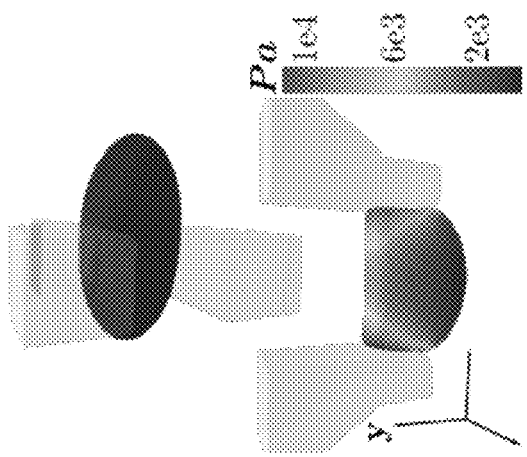
FIG. 9A depicts maximum stress for two different grasp models on a spheroid-shaped object, for E=2e4.
Figure 9B:
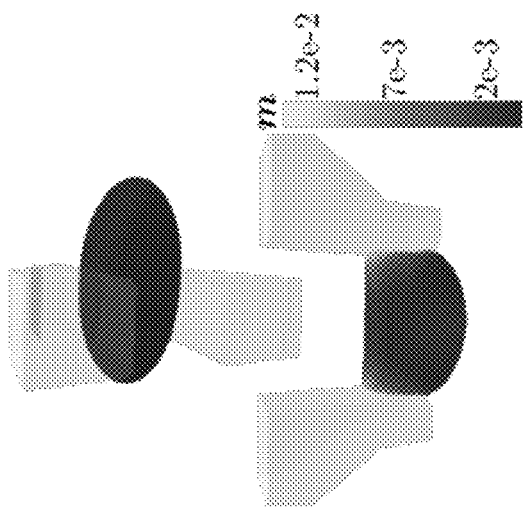
FIG. 9B depicts maximum deformation for the grasp models of FIG. 9A.
Figure 9C:
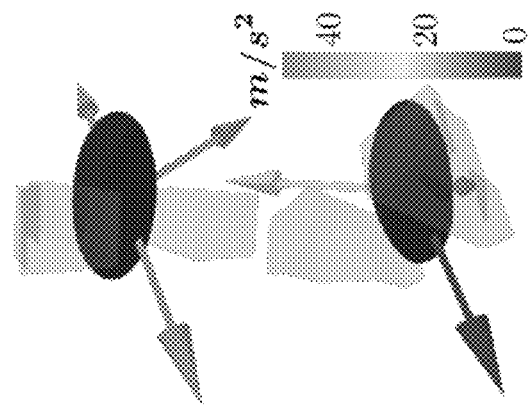
FIG. 9C depicts linear instability for the grasp models of FIG. 9A.

FIG. 9A depicts maximum stress for two different grasp models on a spheroid-shaped object, for E=2e4. FIG. 9B depicts maximum deformation for the grasp models of FIG. 9A. FIG. 9C depicts linear instability for the grasp models of FIG. 9A.

FIG. 10A depicts maximum stress for two different grasp models on a cup-shaped object, for E=2e4.

FIG. 10B depicts maximum deformation for the grasp models of FIG. 10A.

FIG. 10C depicts a grasp model in which contact is made at the base of the cup-shaped object of FIG. 10A. Even though the maximum deformation is low, the grasp model results in high maximum stress.

FIG. 11A depicts deformation controllability for two different grasp models on a cup-shaped object, for E=2e4.

FIG. 11B depicts linear instability for the grasp models of FIG. 11A.

FIG. 11C linear instability for the grasp models of FIG. 11A.

Figure 12A:
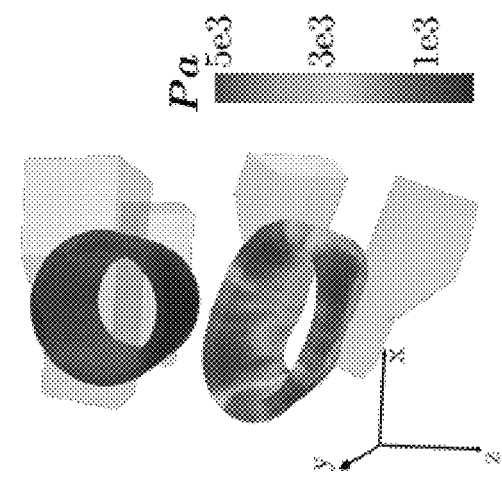
FIG. 12A depicts maximum stress for two different grasp models on a ring-shaped object, for E=2e4.

FIG. 12A depicts maximum stress for two different grasp models on a ring-shaped object, for E=2e4.

Figure 12B:
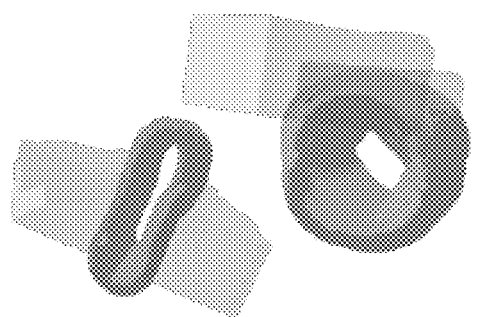
FIG. 12B depicts maximum deformation for the grasp models of FIG. 12A.

FIG. 12B depicts maximum deformation for the grasp models of FIG. 12A.

Figure 12C:
FIG. 12C depicts deformation controllability for the grasp models of FIG. 12A.

FIG. 12C depicts deformation controllability for the grasp models of FIG. 12A.

Figures 13A, 13B:
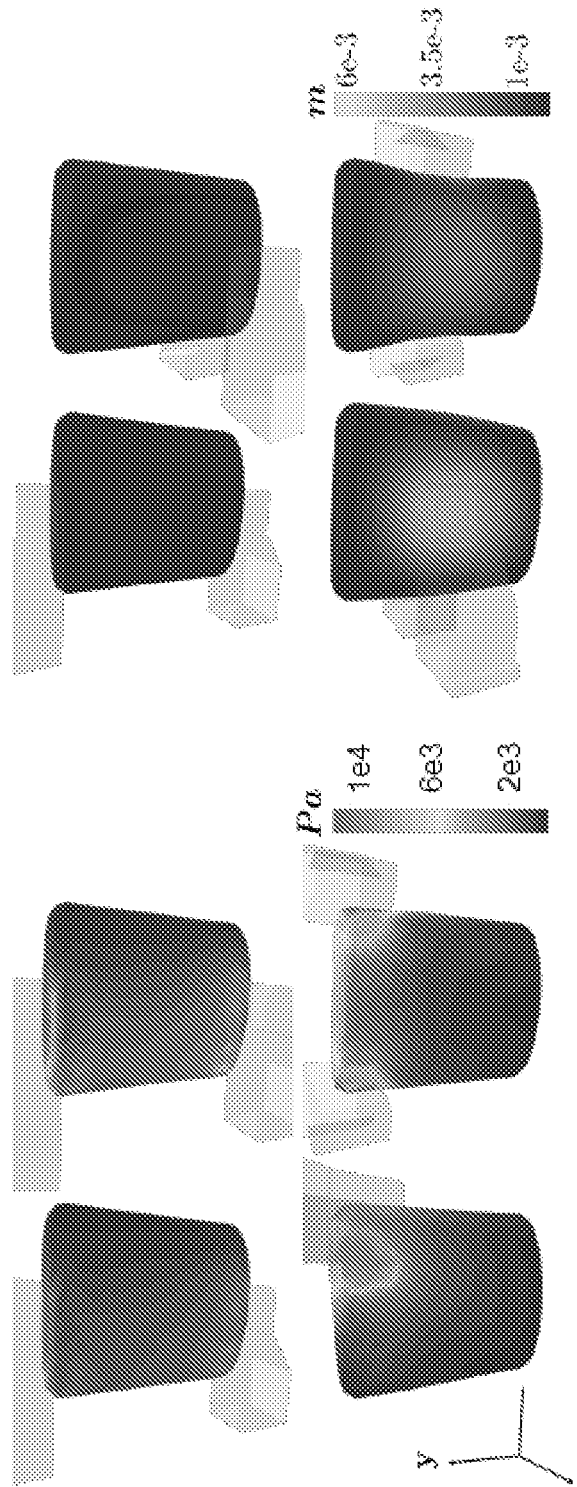
FIG. 13A depicts maximum stress for two different grasp models on a flask-shaped object, for E=2e5.
FIG. 13B depicts maximum deformation for the grasp models of FIG. 13A.

FIG. 13A depicts maximum stress for two different grasp models on a flask-shaped object, for E=2e5.

FIG. 13B depicts maximum deformation for the grasp models of FIG. 13A.

Figures 14A, 14B, 14C, 14D, 14E:
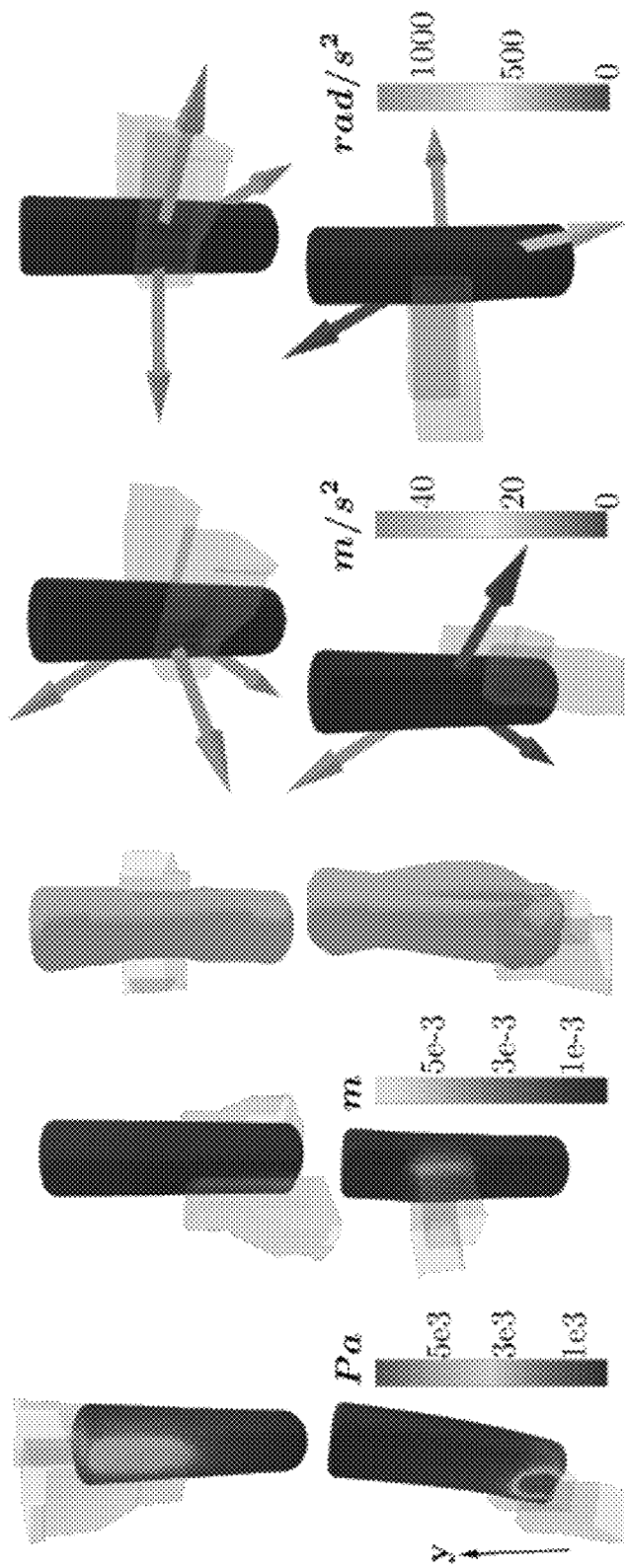
FIG. 14A depicts stress for two different grasp models on a cylinder-shaped object, for E=2e4.
FIG. 14B depicts deformation for the two different grasp models of FIG. 14A.
FIG. 14C depicts deformation controllability for the two different grasp models of FIG. 14A.
FIG. 14D depicts linear instability for the two different grasp models of FIG. 14A.
FIG. 14E depicts angular instability for the two different grasp models of FIG. 14A.

FIG. 14A depicts stress for two different grasp models on a cylinder-shaped object, for E=2e4. FIG. 14B depicts deformation for the two different grasp models of FIG. 14A. FIG. 14C depicts deformation controllability for the two different grasp models of FIG. 14A. FIG. 14D depicts linear instability for the two different grasp models of FIG. 14A. FIG. 14E depicts angular instability for the two different grasp models of FIG. 14A.

The algorithms and techniques disclosed herein may be executed by computing devices utilizing one or more graphic processing unit (GPU) and/or general purpose data processor (e.g., a 'central processing unit or CPU). For example aspects of the process 200, process 300, process 400, physics simulator 110, and/or path planner 114 may be carried out on such devices. Exemplary architectures will now be described that may be configured to carry out the techniques disclosed herein on such devices.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 15:
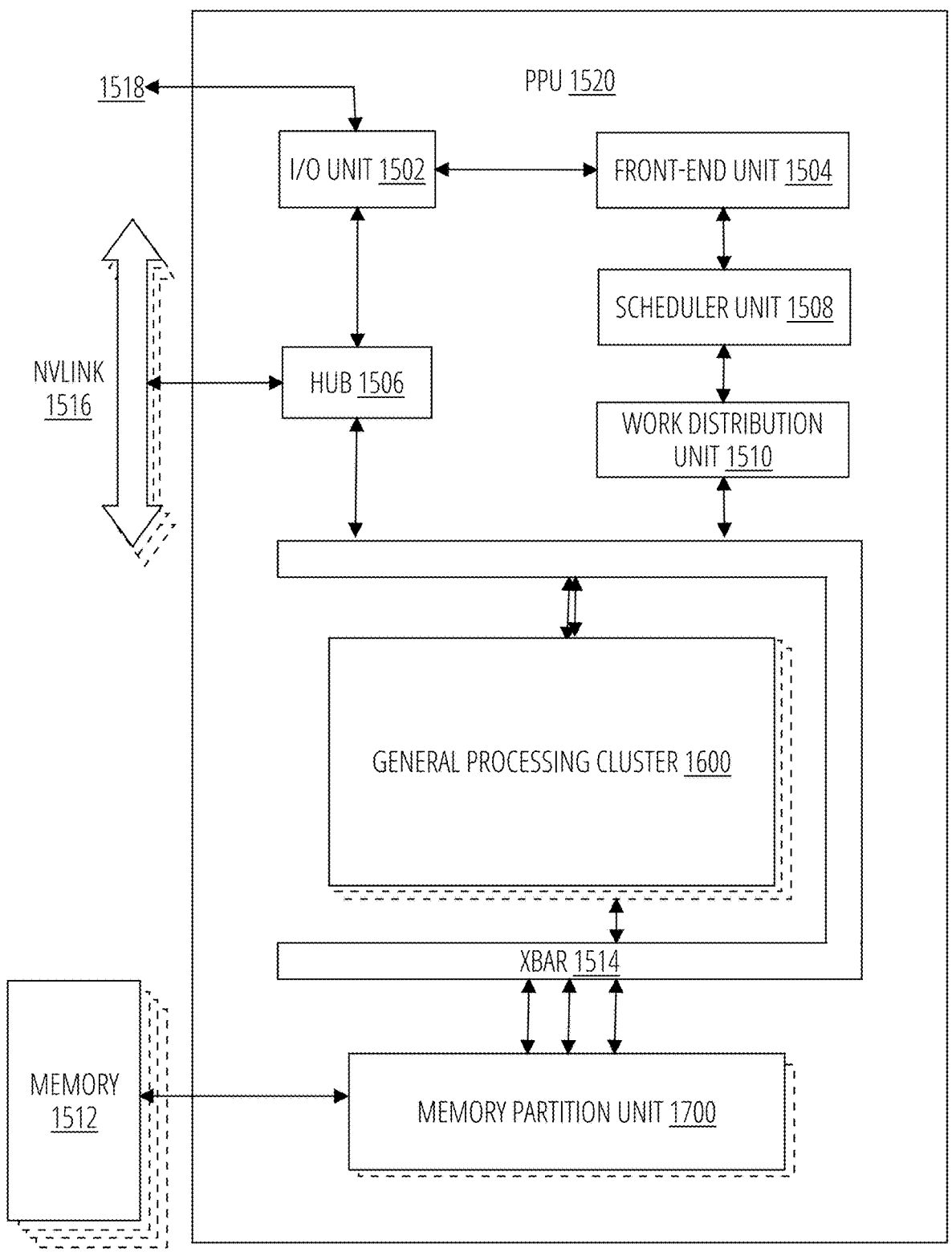
FIG. 15 depicts a parallel processing unit 1520 in accordance with one embodiment.

FIG. 15 depicts a parallel processing unit 1520, in accordance with an embodiment. In an embodiment, the parallel processing unit 1520 is a multi-threaded processor that is implemented on one or more integrated circuit devices. The parallel processing unit 1520 is a latency hiding architecture designed to process many threads in parallel. A thread (e.g., a thread of execution) is an instantiation of a set of instructions configured to be executed by the parallel processing unit 1520. In an embodiment, the parallel processing unit 1520 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1520 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1520 modules may be configured to accelerate thousands of High Performance Computing (HPC), data center, and machine learning applications. The parallel processing unit 1520 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 15, the parallel processing unit 1520 includes an I/O unit 1502, a front-end unit 1504, a scheduler unit 1508, a work distribution unit 1510, a hub 1506, a crossbar 1514, one or more general processing cluster 1600 modules, and one or more memory partition unit 1700 modules. The parallel processing unit 1520 may be connected to a host processor or other parallel processing unit 1520 modules via one or more high-speed NVLink 1516 interconnects. The parallel processing unit 1520 may be connected to a host processor or other peripheral devices via an interconnect 1518. The parallel processing unit 1520 may also be connected to a local memory comprising a number of memory 1512 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1512 may comprise logic to configure the parallel processing unit 1520 to carry out aspects of the techniques disclosed herein.

The NVLink 1516 interconnect enables systems to scale and include one or more parallel processing unit 1520 modules combined with one or more CPUs, supports cache coherence between the parallel processing unit 1520 modules and CPUs, and CPU mastering. Data and/or commands may be transmitted by the NVLink 1516 through the hub 1506 to/from other units of the parallel processing unit 1520 such as one or more copy engines, a video encoder, a video decoder, a power management unit, etc. (not explicitly shown). The NVLink 1516 is described in more detail in conjunction with FIG. 19.

The I/O unit 1502 is configured to transmit and receive communications (e.g., commands, data, etc.) from a host processor (not shown) over the interconnect 1518. The I/O unit 1502 may communicate with the host processor directly via the interconnect 1518 or through one or more intermediate devices such as a memory bridge. In an embodiment, the I/O unit 1502 may communicate with one or more other processors, such as one or more parallel processing unit 1520 modules via the interconnect 1518. In an embodiment, the I/O unit 1502 implements a Peripheral Component Interconnect Express (PCIe) interface for communications over a PCIe bus and the interconnect 1518 is a PCIe bus. In alternative embodiments, the I/O unit 1502 may implement other types of well-known interfaces for communicating with external devices.

The I/O unit 1502 decodes packets received via the interconnect 1518. In an embodiment, the packets represent commands configured to cause the parallel processing unit 1520 to perform various operations. The I/O unit 1502 transmits the decoded commands to various other units of the parallel processing unit 1520 as the commands may specify. For example, some commands may be transmitted to the front-end unit 1504. Other commands may be transmitted to the hub 1506 or other units of the parallel processing unit 1520 such as one or more copy engines, a video encoder, a video decoder, a power management unit, etc. (not explicitly shown). In other words, the I/O unit 1502 is configured to route communications between and among the various logical units of the parallel processing unit 1520.

In an embodiment, a program executed by the host processor encodes a command stream in a buffer that provides workloads to the parallel processing unit 1520 for processing. A workload may comprise several instructions and data to be processed by those instructions. The buffer is a region in a memory that is accessible (e.g., read/write) by both the host processor and the parallel processing unit 1520. For example, the I/O unit 1502 may be configured to access the buffer in a system memory connected to the interconnect 1518 via memory requests transmitted over the interconnect 1518. In an embodiment, the host processor writes the command stream to the buffer and then transmits a pointer to the start of the command stream to the parallel processing unit 1520. The front-end unit 1504 receives pointers to one or more command streams. The front-end unit 1504 manages the one or more streams, reading commands from the streams and forwarding commands to the various units of the parallel processing unit 1520.

The front-end unit 1504 is coupled to a scheduler unit 1508 that configures the various general processing cluster 1600 modules to process tasks defined by the one or more streams. The scheduler unit 1508 is configured to track state information related to the various tasks managed by the scheduler unit 1508. The state may indicate which general processing cluster 1600 a task is assigned to, whether the task is active or inactive, a priority level associated with the task, and so forth. The scheduler unit 1508 manages the execution of a plurality of tasks on the one or more general processing cluster 1600 modules.

The scheduler unit 1508 is coupled to a work distribution unit 1510 that is configured to dispatch tasks for execution on the general processing cluster 1600 modules. The work distribution unit 1510 may track a number of scheduled tasks received from the scheduler unit 1508. In an embodiment, the work distribution unit 1510 manages a pending task pool and an active task pool for each of the general processing cluster 1600 modules. The pending task pool may comprise a number of slots (e.g., 32 slots) that contain tasks assigned to be processed by a particular general processing cluster 1600. The active task pool may comprise a number of slots (e.g., 4 slots) for tasks that are actively being processed by the general processing cluster 1600 modules. As a general processing cluster 1600 finishes the execution of a task, that task is evicted from the active task pool for the general processing cluster 1600 and one of the other tasks from the pending task pool is selected and scheduled for execution on the general processing cluster 1600. If an active task has been idle on the general processing cluster 1600, such as while waiting for a data dependency to be resolved, then the active task may be evicted from the general processing cluster 1600 and returned to the pending task pool while another task in the pending task pool is selected and scheduled for execution on the general processing cluster 1600.

The work distribution unit 1510 communicates with the one or more general processing cluster 1600 modules via crossbar 1514. The crossbar 1514 is an interconnect network that couples many of the units of the parallel processing unit 1520 to other units of the parallel processing unit 1520. For example, the crossbar 1514 may be configured to couple the work distribution unit 1510 to a particular general processing cluster 1600. Although not shown explicitly, one or more other units of the parallel processing unit 1520 may also be connected to the crossbar 1514 via the hub 1506.

The tasks are managed by the scheduler unit 1508 and dispatched to a general processing cluster 1600 by the work distribution unit 1510. The general processing cluster 1600 is configured to process the task and generate results. The results may be consumed by other tasks within the general processing cluster 1600, routed to a different general processing cluster 1600 via the crossbar 1514, or stored in the memory 1512. The results can be written to the memory 1512 via the memory partition unit 1700 modules, which implement a memory interface for reading and writing data to/from the memory 1512. The results can be transmitted to another parallel processing unit 1520 or CPU via the NVLink 1516. In an embodiment, the parallel processing unit 1520 includes a number U of memory partition unit 1700 modules that is equal to the number of separate and distinct memory 1512 devices coupled to the parallel processing unit 1520. A memory partition unit 1700 will be described in more detail below in conjunction with FIG. 17.

In an embodiment, a host processor executes a driver kernel that implements an application programming interface (API) that enables one or more applications executing on the host processor to schedule operations for execution on the parallel processing unit 1520. In an embodiment, multiple compute applications are simultaneously executed by the parallel processing unit 1520 and the parallel processing unit 1520 provides isolation, quality of service (QoS), and independent address spaces for the multiple compute applications. An application may generate instructions (e.g., API calls) that cause the driver kernel to generate one or more tasks for execution by the parallel processing unit 1520. The driver kernel outputs tasks to one or more streams being processed by the parallel processing unit 1520. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 18.

Figure 16:
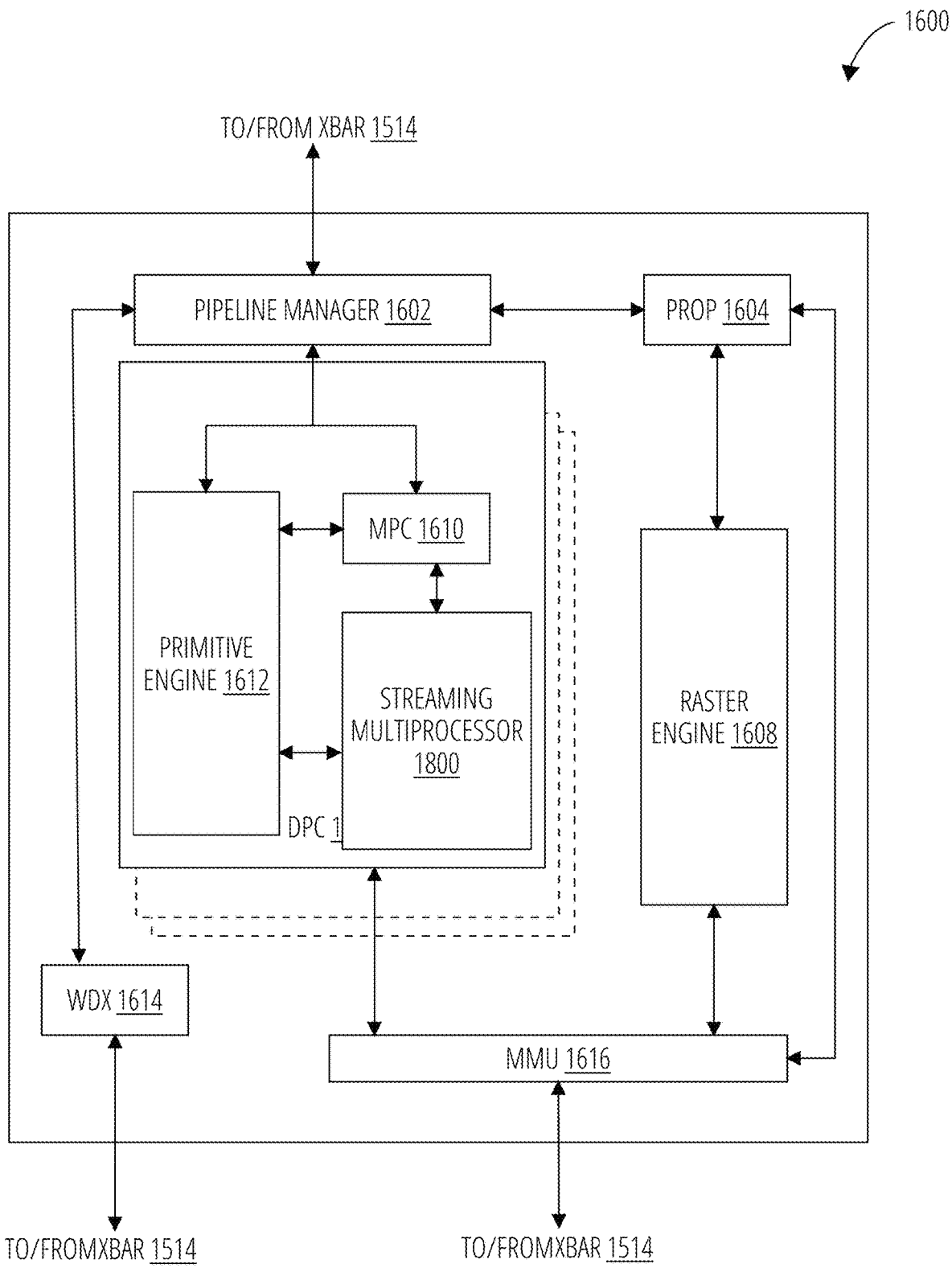
FIG. 16 depicts a general processing cluster 1600 in accordance with one embodiment.

FIG. 16 depicts a general processing cluster 1600 of the parallel processing unit 1520 of FIG. 15, in accordance with an embodiment. As shown in FIG. 16, each general processing cluster 1600 includes a number of hardware units for processing tasks. In an embodiment, each general processing cluster 1600 includes a pipeline manager 1602, a pre-raster operations unit 1604, a raster engine 1608, a work distribution crossbar 1614, a memory management unit 1616, and one or more data processing cluster 1606. It will be appreciated that the general processing cluster 1600 of FIG. 16 may include other hardware units in lieu of or in addition to the units shown in FIG. 16.

In an embodiment, the operation of the general processing cluster 1600 is controlled by the pipeline manager 1602. The pipeline manager 1602 manages the configuration of the one or more data processing cluster 1606 modules for processing tasks allocated to the general processing cluster 1600. In an embodiment, the pipeline manager 1602 may configure at least one of the one or more data processing cluster 1606 modules to implement at least a portion of a graphics rendering pipeline. For example, a data processing cluster 1606 may be configured to execute a vertex shader program on the programmable streaming multiprocessor 1800. The pipeline manager 1602 may also be configured to route packets received from the work distribution unit 1510 to the appropriate logical units within the general processing cluster 1600. For example, some packets may be routed to fixed function hardware units in the pre-raster operations unit 1604 and/or raster engine 1608 while other packets may be routed to the data processing cluster 1606 modules for processing by the primitive engine 1612 or the streaming multiprocessor 1800. In an embodiment, the pipeline manager 1602 may configure at least one of the one or more data processing cluster 1606 modules to implement a neural network model and/or a computing pipeline.

Figure 17:
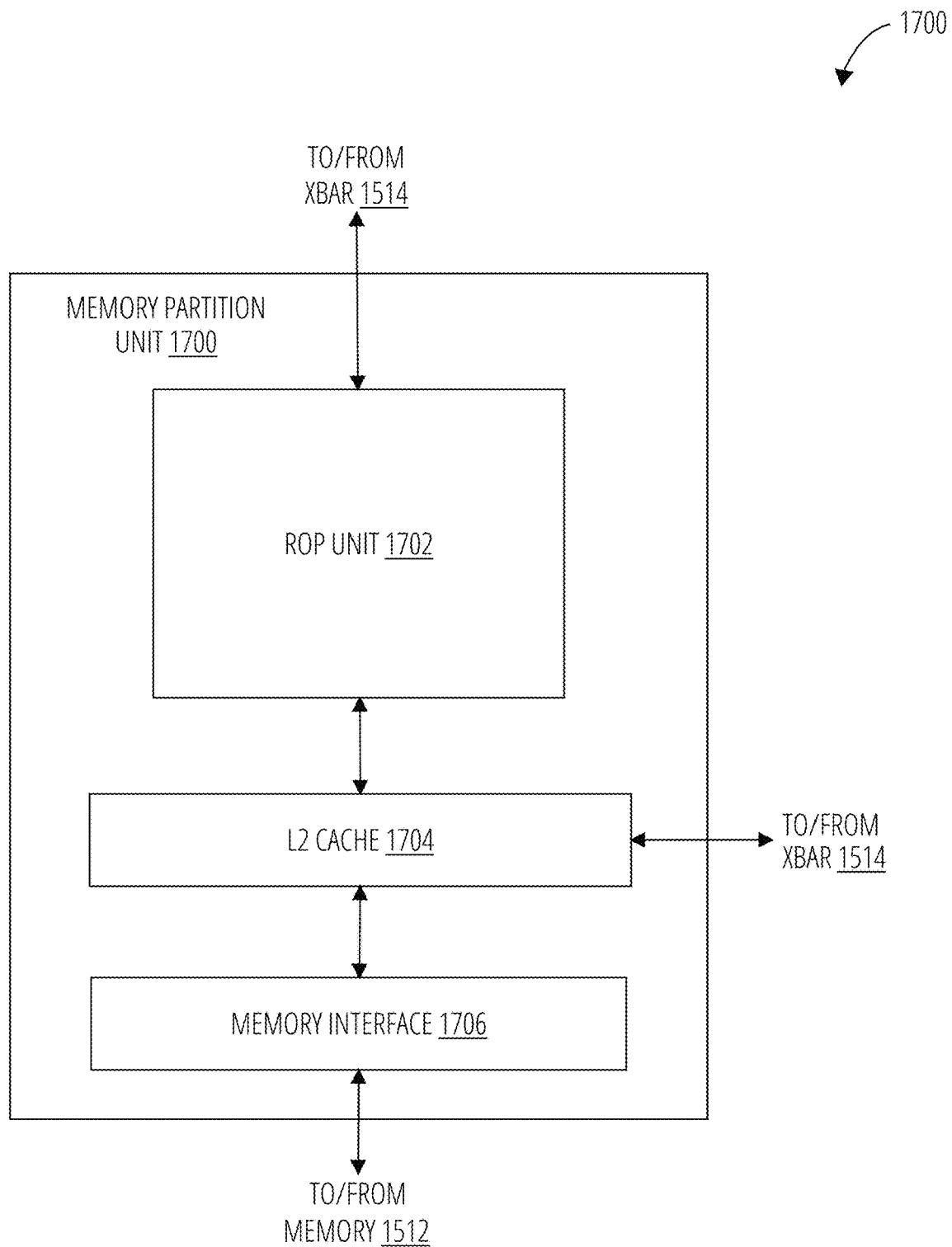
FIG. 17 depicts a memory partition unit 1700 in accordance with one embodiment.

The pre-raster operations unit 1604 is configured to route data generated by the raster engine 1608 and the data processing cluster 1606 modules to a Raster Operations (ROP) unit, described in more detail in conjunction with FIG. 17. The pre-raster operations unit 1604 may also be configured to perform optimizations for color blending, organize pixel data, perform address translations, and the like.

The raster engine 1608 includes a number of fixed function hardware units configured to perform various raster operations. In an embodiment, the raster engine 1608 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1608 comprises fragments to be processed, for example, by a fragment shader implemented within a data processing cluster 1606.

Each data processing cluster 1606 included in the general processing cluster 1600 includes an M-pipe controller 1610, a primitive engine 1612, and one or more streaming multiprocessor 1800 modules. The M-pipe controller 1610 controls the operation of the data processing cluster 1606, routing packets received from the pipeline manager 1602 to the appropriate units in the data processing cluster 1606. For example, packets associated with a vertex may be routed to the primitive engine 1612, which is configured to fetch vertex attributes associated with the vertex from the memory 1512. In contrast, packets associated with a shader program may be transmitted to the streaming multiprocessor 1800.

The streaming multiprocessor 1800 comprises a programmable streaming processor that is configured to process tasks represented by a number of threads. Each streaming multiprocessor 1800 is multi-threaded and configured to execute a plurality of threads (e.g., 32 threads) from a particular group of threads concurrently. In an embodiment, the streaming multiprocessor 1800 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1800 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1800 will be described in more detail below in conjunction with FIG. 18.

The memory management unit 1616 provides an interface between the general processing cluster 1600 and the memory partition unit 1700. The memory management unit 1616 may provide translation of virtual addresses into physical addresses, memory protection, and arbitration of memory requests. In an embodiment, the memory management unit 1616 provides one or more translation lookaside buffers (TLBs) for performing translation of virtual addresses into physical addresses in the memory 1512.

FIG. 17 depicts a memory partition unit 1700 of the parallel processing unit 1520 of FIG. 15, in accordance with an embodiment. As shown in FIG. 17, the memory partition unit 1700 includes a raster operations unit 1702, a level two cache 1704, and a memory interface 1706. The memory interface 1706 is coupled to the memory 1512. Memory interface 1706 may implement 32, 64, 128, 1024-bit data buses, or the like, for high-speed data transfer. In an embodiment, the parallel processing unit 1520 incorporates U memory interface 1706 modules, one memory interface 1706 per pair of memory partition unit 1700 modules, where each pair of memory partition unit 1700 modules is connected to a corresponding memory 1512 device. For example, parallel processing unit 1520 may be connected to up to Y memory 1512 devices, such as high bandwidth memory stacks or graphics double-data-rate, version 5, synchronous dynamic random access memory, or other types of persistent storage.

In an embodiment, the memory interface 1706 implements an HBM2 memory interface and Y equals half U. In an embodiment, the HBM2 memory stacks are located on the same physical package as the parallel processing unit 1520, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1512 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1520 modules process very large datasets and/or run applications for extended periods.

In an embodiment, the parallel processing unit 1520 implements a multi-level memory hierarchy. In an embodiment, the memory partition unit 1700 supports a unified memory to provide a single unified virtual address space for CPU and parallel processing unit 1520 memory, enabling data sharing between virtual memory systems. In an embodiment the frequency of accesses by a parallel processing unit 1520 to memory located on other processors is traced to ensure that memory pages are moved to the physical memory of the parallel processing unit 1520 that is accessing the pages more frequently. In an embodiment, the NVLink 1516 supports address translation services allowing the parallel processing unit 1520 to directly access a CPU's page tables and providing full access to CPU memory by the parallel processing unit 1520.

In an embodiment, copy engines transfer data between multiple parallel processing unit 1520 modules or between parallel processing unit 1520 modules and CPUs. The copy engines can generate page faults for addresses that are not mapped into the page tables. The memory partition unit 1700 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1512 or other system memory may be fetched by the memory partition unit 1700 and stored in the level two cache 1704, which is located on-chip and is shared between the various general processing cluster 1600 modules. As shown, each memory partition unit 1700 includes a portion of the level two cache 1704 associated with a corresponding memory 1512 device. Lower level caches may then be implemented in various units within the general processing cluster 1600 modules. For example, each of the streaming multiprocessor 1800 modules may implement an L1 cache. The L1 cache is private memory that is dedicated to a particular streaming multiprocessor 1800. Data from the level two cache 1704 may be fetched and stored in each of the L1 caches for processing in the functional units of the streaming multiprocessor 1800 modules. The level two cache 1704 is coupled to the memory interface 1706 and the crossbar 1514.

The raster operations unit 1702 performs graphics raster operations related to pixel color, such as color compression, pixel blending, and the like. The raster operations unit 1702 also implements depth testing in conjunction with the raster engine 1608, receiving a depth for a sample location associated with a pixel fragment from the culling engine of the raster engine 1608. The depth is tested against a corresponding depth in a depth buffer for a sample location associated with the fragment. If the fragment passes the depth test for the sample location, then the raster operations unit 1702 updates the depth buffer and transmits a result of the depth test to the raster engine 1608. It will be appreciated that the number of partition memory partition unit 1700 modules may be different than the number of general processing cluster 1600 modules and, therefore, each raster operations unit 1702 may be coupled to each of the general processing cluster 1600 modules. The raster operations unit 1702 tracks packets received from the different general processing cluster 1600 modules and determines which general processing cluster 1600 that a result generated by the raster operations unit 1702 is routed to through the crossbar 1514. Although the raster operations unit 1702 is included within the memory partition unit 1700 in FIG. 17, in other embodiment, the raster operations unit 1702 may be outside of the memory partition unit 1700. For example, the raster operations unit 1702 may reside in the general processing cluster 1600 or another unit.

Figure 18:
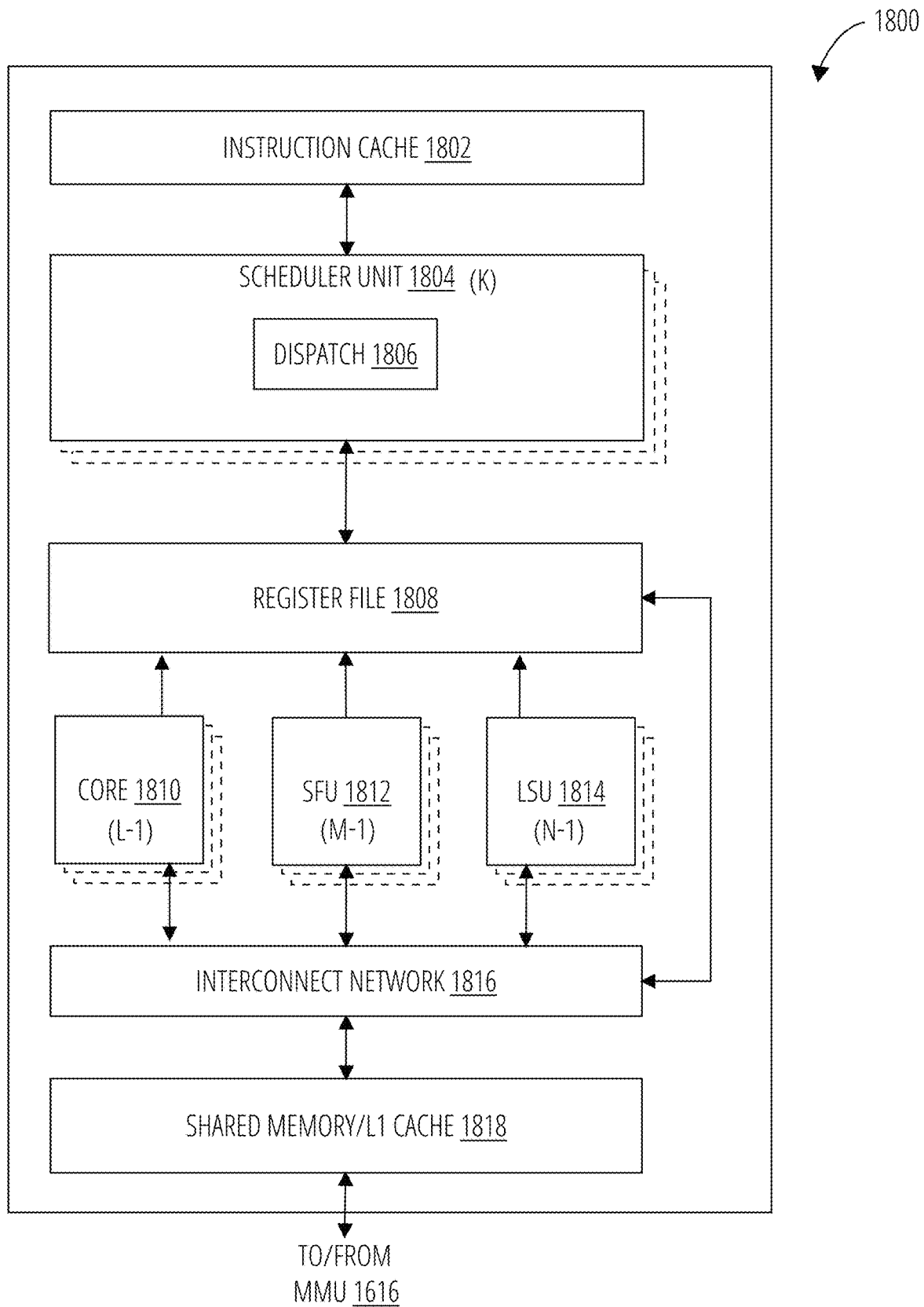
FIG. 18 depicts a streaming multiprocessor 1800 in accordance with one embodiment.

FIG. 18 illustrates the streaming multiprocessor 1800 of FIG. 16, in accordance with an embodiment. As shown in FIG. 18, the streaming multiprocessor 1800 includes an instruction cache 1802, one or more scheduler unit 1804 modules (e.g., such as scheduler unit 1508), a register file 1808, one or more processing core 1810 modules, one or more special function unit 1812 modules, one or more load/store unit 1814 modules, an interconnect network 1816, and a shared memory/L1 cache 1818.

As described above, the work distribution unit 1510 dispatches tasks for execution on the general processing cluster 1600 modules of the parallel processing unit 1520. The tasks are allocated to a particular data processing cluster 1606 within a general processing cluster 1600 and, if the task is associated with a shader program, the task may be allocated to a streaming multiprocessor 1800. The scheduler unit 1508 receives the tasks from the work distribution unit 1510 and manages instruction scheduling for one or more thread blocks assigned to the streaming multiprocessor 1800. The scheduler unit 1804 schedules thread blocks for execution as warps of parallel threads, where each thread block is allocated at least one warp. In an embodiment, each warp executes 32 threads. The scheduler unit 1804 may manage a plurality of different thread blocks, allocating the warps to the different thread blocks and then dispatching instructions from the plurality of different cooperative groups to the various functional units (e.g., core 1810 modules, special function unit 1812 modules, and load/store unit 1814 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1806 unit is configured within the scheduler unit 1804 to transmit instructions to one or more of the functional units. In one embodiment, the scheduler unit 1804 includes two dispatch 1806 units that enable two different instructions from the same warp to be dispatched during each clock cycle. In alternative embodiments, each scheduler unit 1804 may include a single dispatch 1806 unit or additional dispatch 1806 units.

Each streaming multiprocessor 1800 includes a register file 1808 that provides a set of registers for the functional units of the streaming multiprocessor 1800. In an embodiment, the register file 1808 is divided between each of the functional units such that each functional unit is allocated a dedicated portion of the register file 1808. In another embodiment, the register file 1808 is divided between the different warps being executed by the streaming multiprocessor 1800. The register file 1808 provides temporary storage for operands connected to the data paths of the functional units.

Each streaming multiprocessor 1800 comprises L processing core 1810 modules. In an embodiment, the streaming multiprocessor 1800 includes a large number (e.g., 128, etc.) of distinct processing core 1810 modules. Each core 1810 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1810 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1810 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1800 also comprises M special function unit 1812 modules that perform special functions (e.g., attribute evaluation, reciprocal square root, and the like). In an embodiment, the special function unit 1812 modules may include a tree traversal unit configured to traverse a hierarchical tree data structure. In an embodiment, the special function unit 1812 modules may include texture unit configured to perform texture map filtering operations. In an embodiment, the texture units are configured to load texture maps (e.g., a 2D array of texels) from the memory 1512 and sample the texture maps to produce sampled texture values for use in shader programs executed by the streaming multiprocessor 1800. In an embodiment, the texture maps are stored in the shared memory/L1 cache 1818. The texture units implement texture operations such as filtering operations using mip-maps (e.g., texture maps of varying levels of detail). In an embodiment, each streaming multiprocessor 1800 includes two texture units.

Each streaming multiprocessor 1800 also comprises N load/store unit 1814 modules that implement load and store operations between the shared memory/L1 cache 1818 and the register file 1808. Each streaming multiprocessor 1800 includes an interconnect network 1816 that connects each of the functional units to the register file 1808 and the load/store unit 1814 to the register file 1808 and shared memory/L1 cache 1818. In an embodiment, the interconnect network 1816 is a crossbar that can be configured to connect any of the functional units to any of the registers in the register file 1808 and connect the load/store unit 1814 modules to the register file 1808 and memory locations in shared memory/L1 cache 1818.

The shared memory/L1 cache 1818 is an array of on-chip memory that allows for data storage and communication between the streaming multiprocessor 1800 and the primitive engine 1612 and between threads in the streaming multiprocessor 1800. In an embodiment, the shared memory/L1 cache 1818 comprises 128 KB of storage capacity and is in the path from the streaming multiprocessor 1800 to the memory partition unit 1700. The shared memory/L1 cache 1818 can be used to cache reads and writes. One or more of the shared memory/L1 cache 1818, level two cache 1704, and memory 1512 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1818 enables the shared memory/L1 cache 1818 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 15, are bypassed, creating a much simpler programming model. In the general purpose parallel computation configuration, the work distribution unit 1510 assigns and distributes blocks of threads directly to the data processing cluster 1606 modules. The threads in a block execute the same program, using a unique thread ID in the calculation to ensure each thread generates unique results, using the streaming multiprocessor 1800 to execute the program and perform calculations, shared memory/L1 cache 1818 to communicate between threads, and the load/store unit 1814 to read and write global memory through the shared memory/L1 cache 1818 and the memory partition unit 1700. When configured for general purpose parallel computation, the streaming multiprocessor 1800 can also write commands that the scheduler unit 1508 can use to launch new work on the data processing cluster 1606 modules.

The parallel processing unit 1520 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1520 is embodied on a single semiconductor substrate. In another embodiment, the parallel processing unit 1520 is included in a system-on-a-chip (SoC) along with one or more other devices such as additional parallel processing unit 1520 modules, the memory 1512, a reduced instruction set computer (RISC) CPU, a memory management unit (MMU), a digital-to-analog converter (DAC), and the like.

In an embodiment, the parallel processing unit 1520 may be included on a graphics card that includes one or more memory devices. The graphics card may be configured to interface with a PCIe slot on a motherboard of a desktop computer. In yet another embodiment, the parallel processing unit 1520 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 19:
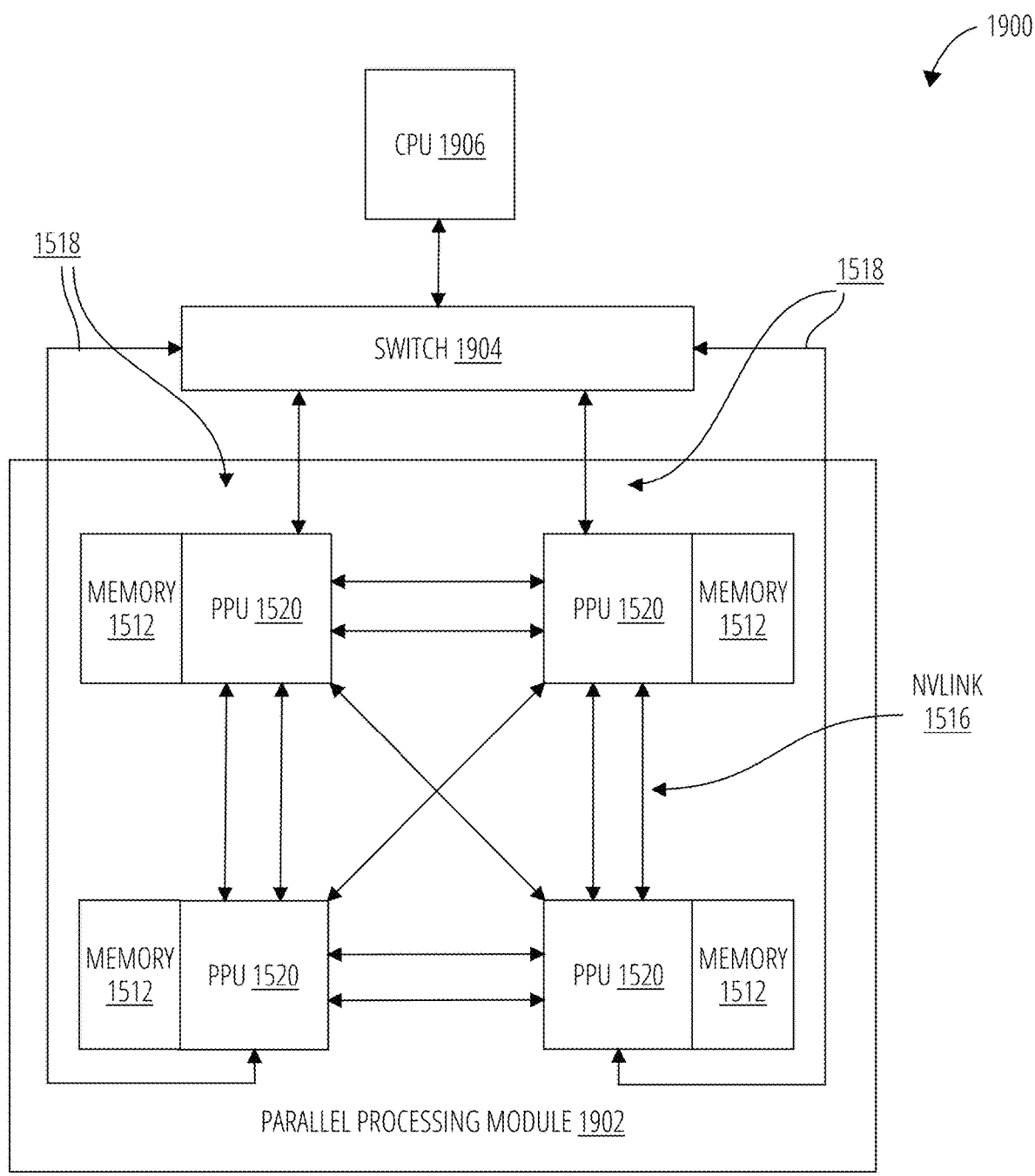
FIG. 19 depicts a processing system 1900 in accordance with one embodiment.

FIG. 19 is a conceptual diagram of a processing system 1900 implemented using the parallel processing unit 1520 of FIG. 15, in accordance with an embodiment. The processing system 1900 includes a central processing unit 1906, switch 1904, and multiple parallel processing unit 1520 modules each and respective memory 1512 modules. The NVLink 1516 provides high-speed communication links between each of the parallel processing unit 1520 modules. Although a particular number of NVLink 1516 and interconnect 1518 connections are illustrated in FIG. 19, the number of connections to each parallel processing unit 1520 and the central processing unit 1906 may vary. The switch 1904 interfaces between the interconnect 1518 and the central processing unit 1906. The parallel processing unit 1520 modules, memory 1512 modules, and NVLink 1516 connections may be situated on a single semiconductor platform to form a parallel processing module 1902. In an embodiment, the switch 1904 supports two or more protocols to interface between various different connections and/or links.

In another embodiment (not shown), the NVLink 1516 provides one or more high-speed communication links between each of the parallel processing unit modules (parallel processing unit 1520, parallel processing unit 1520, parallel processing unit 1520, and parallel processing unit 1520) and the central processing unit 1906 and the switch 1904 interfaces between the interconnect 1518 and each of the parallel processing unit modules. The parallel processing unit modules, memory 1512 modules, and interconnect 1518 may be situated on a single semiconductor platform to form a parallel processing module 1902. In yet another embodiment (not shown), the interconnect 1518 provides one or more communication links between each of the parallel processing unit modules and the central processing unit 1906 and the switch 1904 interfaces between each of the parallel processing unit modules using the NVLink 1516 to provide one or more high-speed communication links between the parallel processing unit modules. In another embodiment (not shown), the NVLink 1516 provides one or more high-speed communication links between the parallel processing unit modules and the central processing unit 1906 through the switch 1904. In yet another embodiment (not shown), the interconnect 1518 provides one or more communication links between each of the parallel processing unit modules directly. One or more of the NVLink 1516 high-speed communication links may be implemented as a physical NVLink interconnect or either an on-chip or on-die interconnect using the same protocol as the NVLink 1516.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1902 may be implemented as a circuit board substrate and each of the parallel processing unit modules and/or memory 1512 modules may be packaged devices. In an embodiment, the central processing unit 1906, switch 1904, and the parallel processing module 1902 are situated on a single semiconductor platform.

In an embodiment, the signaling rate of each NVLink 1516 is 20 to 25 Gigabits/second and each parallel processing unit module includes six NVLink 1516 interfaces (as shown in FIG. 19, five NVLink 1516 interfaces are included for each parallel processing unit module). Each NVLink 1516 provides a data transfer rate of 25 Gigabytes/second in each direction, with six links providing 300 Gigabytes/second. The NVLink 1516 can be used exclusively for PPU-to-PPU communication as shown in FIG. 19, or some combination of PPU-to-PPU and PPU-to-CPU, when the central processing unit 1906 also includes one or more NVLink 1516 interfaces.

In an embodiment, the NVLink 1516 allows direct load/store/atomic access from the central processing unit 1906 to each parallel processing unit module's memory 1512. In an embodiment, the NVLink 1516 supports coherency operations, allowing data read from the memory 1512 modules to be stored in the cache hierarchy of the central processing unit 1906, reducing cache access latency for the central processing unit 1906. In an embodiment, the NVLink 1516 includes support for Address Translation Services (ATS), enabling the parallel processing unit module to directly access page tables within the central processing unit 1906. One or more of the NVLink 1516 may also be configured to operate in a low-power mode.

Figure 20:
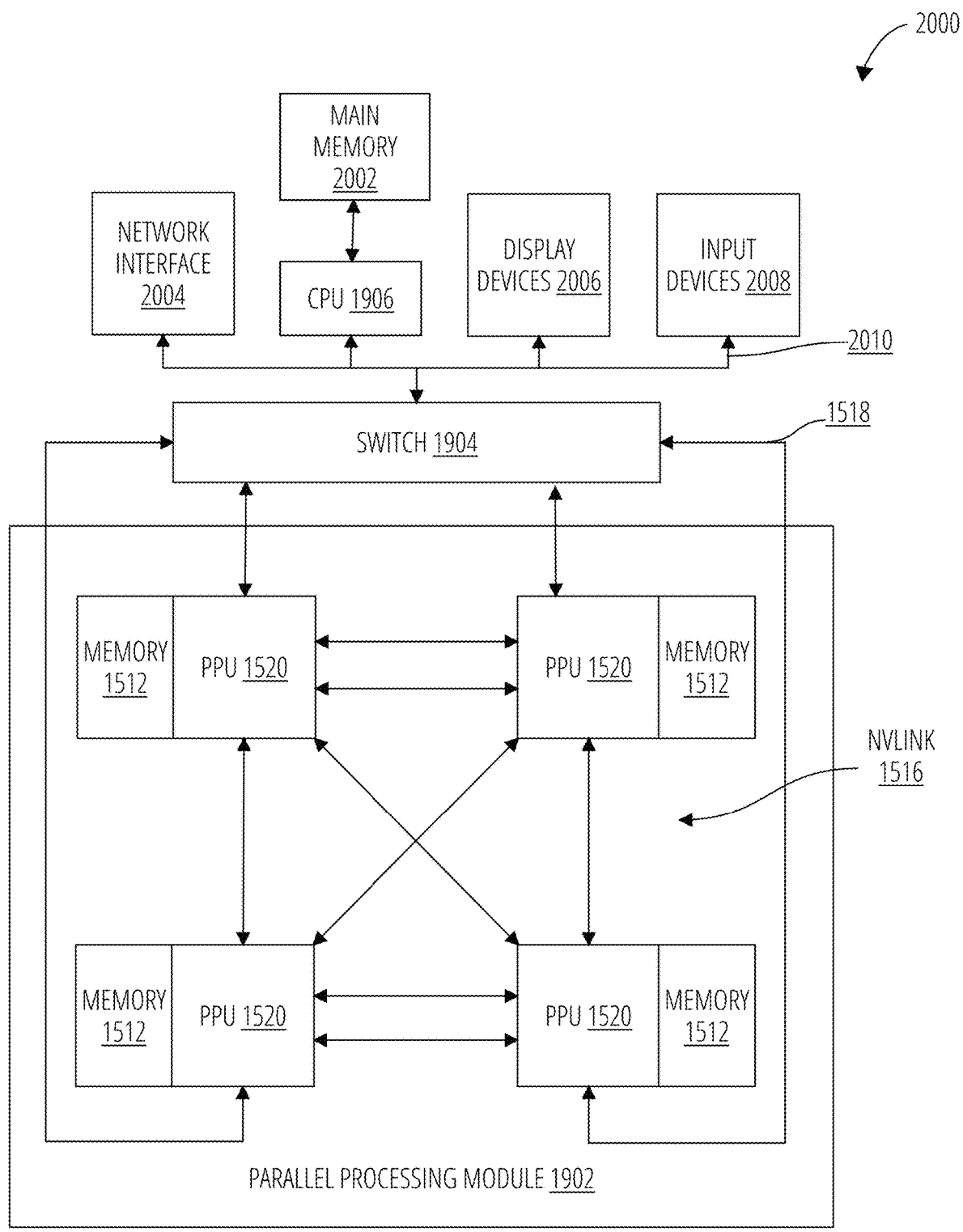
FIG. 20 depicts an exemplary processing system 2000 in accordance with another embodiment.

FIG. 20 depicts an exemplary processing system 2000 in which the various architecture and/or functionality of the various previous embodiments may be implemented. As shown, an exemplary processing system 2000 is provided including at least one central processing unit 1906 that is connected to a communications bus 2010. The communication communications bus 2010 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 2000 also includes a main memory 2002. Control logic (software) and data are stored in the main memory 2002 which may take the form of random access memory (RAM).

The exemplary processing system 2000 also includes input devices 2008, the parallel processing module 1902, and display devices 2006, e.g. a conventional CRT (cathode ray tube), LCD (liquid crystal display), LED (light emitting diode), plasma display or the like. User input may be received from the input devices 2008, e.g., keyboard, mouse, touchpad, microphone, and the like. Each of the foregoing modules and/or devices may even be situated on a single semiconductor platform to form the exemplary processing system 2000. Alternately, the various modules may also be situated separately or in various combinations of semiconductor platforms per the desires of the user.

Further, the exemplary processing system 2000 may be coupled to a network (e.g., a telecommunications network, local area network (LAN), wireless network, wide area network (WAN) such as the Internet, peer-to-peer network, cable network, or the like) through a network interface 2004 for communication purposes.

The exemplary processing system 2000 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 2002 and/or the secondary storage. Such computer programs, when executed, enable the exemplary processing system 2000 to perform various functions. The main memory 2002, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 2000 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 21:
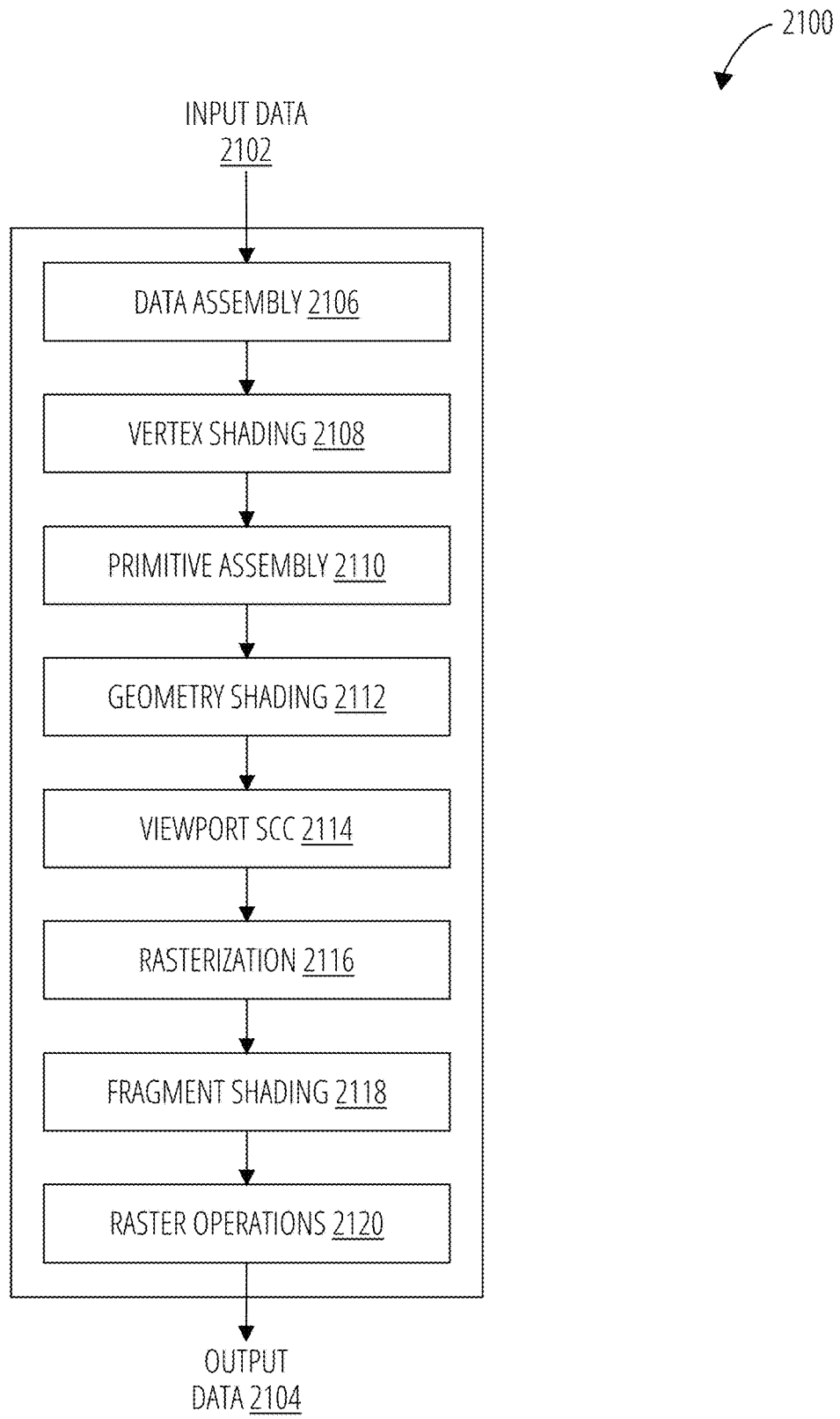
FIG. 21 depicts a graphics processing pipeline 2100 in accordance with one embodiment.

FIG. 21 is a conceptual diagram of a graphics processing pipeline 2100 implemented by the parallel processing unit 1520 of FIG. 15, in accordance with an embodiment. In an embodiment, the parallel processing unit 1520 comprises a graphics processing unit (GPU). The parallel processing unit 1520 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1520 can be configured to process the graphics primitives to generate a frame buffer (e.g., pixel data for each of the pixels of the display).

An application writes model data for a scene (e.g., a collection of vertices and attributes) to a memory such as a system memory or memory 1512. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1800 modules of the parallel processing unit 1520 including one or more of a vertex shader, hull shader, domain shader, geometry shader, and a pixel shader. For example, one or more of the streaming multiprocessor 1800 modules may be configured to execute a vertex shader program that processes a number of vertices defined by the model data. In an embodiment, the different streaming multiprocessor 1800 modules may be configured to execute different shader programs concurrently. For example, a first subset of streaming multiprocessor 1800 modules may be configured to execute a vertex shader program while a second subset of streaming multiprocessor 1800 modules may be configured to execute a pixel shader program. The first subset of streaming multiprocessor 1800 modules processes vertex data to produce processed vertex data and writes the processed vertex data to the level two cache 1704 and/or the memory 1512. After the processed vertex data is rasterized (e.g., transformed from three-dimensional data into two-dimensional data in screen space) to produce fragment data, the second subset of streaming multiprocessor 1800 modules executes a pixel shader to produce processed fragment data, which is then blended with other processed fragment data and written to the frame buffer in memory 1512. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 2100 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2100 receives input data 601 that is transmitted from one stage to the next stage of the graphics processing pipeline 2100 to generate output data 2104. In an embodiment, the graphics processing pipeline 2100 may represent a graphics processing pipeline defined by the OpenGL® API. As an option, the graphics processing pipeline 2100 may be implemented in the context of the functionality and architecture of the previous Figures and/or any subsequent Figure(s).

As shown in FIG. 21, the graphics processing pipeline 2100 comprises a pipeline architecture that includes a number of stages. The stages include, but are not limited to, a data assembly 2106 stage, a vertex shading 2108 stage, a primitive assembly 2110 stage, a geometry shading 2112 stage, a viewport SCC 2114 stage, a rasterization 2116 stage, a fragment shading 2118 stage, and a raster operations 2120 stage. In an embodiment, the input data 2102 comprises commands that configure the processing units to implement the stages of the graphics processing pipeline 2100 and geometric primitives (e.g., points, lines, triangles, quads, triangle strips or fans, etc.) to be processed by the stages. The output data 2104 may comprise pixel data (e.g., color data) that is copied into a frame buffer or other type of surface data structure in a memory.

The data assembly 2106 stage receives the input data 2102 that specifies vertex data for high-order surfaces, primitives, or the like. The data assembly 2106 stage collects the vertex data in a temporary storage or queue, such as by receiving a command from the host processor that includes a pointer to a buffer in memory and reading the vertex data from the buffer. The vertex data is then transmitted to the vertex shading 2108 stage for processing.

The vertex shading 2108 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 2108 stage may manipulate individual vertex attributes such as position, color, texture coordinates, and the like. In other words, the vertex shading 2108 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 2108 stage generates transformed vertex data that is transmitted to the primitive assembly 2110 stage.

The primitive assembly 2110 stage collects vertices output by the vertex shading 2108 stage and groups the vertices into geometric primitives for processing by the geometry shading 2112 stage. For example, the primitive assembly 2110 stage may be configured to group every three consecutive vertices as a geometric primitive (e.g., a triangle) for transmission to the geometry shading 2112 stage. In some embodiments, specific vertices may be reused for consecutive geometric primitives (e.g., two consecutive triangles in a triangle strip may share two vertices). The primitive assembly 2110 stage transmits geometric primitives (e.g., a collection of associated vertices) to the geometry shading 2112 stage.

The geometry shading 2112 stage processes geometric primitives by performing a set of operations (e.g., a geometry shader or program) on the geometric primitives. Tessellation operations may generate one or more geometric primitives from each geometric primitive. In other words, the geometry shading 2112 stage may subdivide each geometric primitive into a finer mesh of two or more geometric primitives for processing by the rest of the graphics processing pipeline 2100. The geometry shading 2112 stage transmits geometric primitives to the viewport SCC 2114 stage.

In an embodiment, the graphics processing pipeline 2100 may operate within a streaming multiprocessor and the vertex shading 2108 stage, the primitive assembly 2110 stage, the geometry shading 2112 stage, the fragment shading 2118 stage, and/or hardware/software associated therewith, may sequentially perform processing operations. Once the sequential processing operations are complete, in an embodiment, the viewport SCC 2114 stage may utilize the data. In an embodiment, primitive data processed by one or more of the stages in the graphics processing pipeline 2100 may be written to a cache (e.g. L1 cache, a vertex cache, etc.). In this case, in an embodiment, the viewport SCC 2114 stage may access the data in the cache. In an embodiment, the viewport SCC 2114 stage and the rasterization 2116 stage are implemented as fixed function circuitry.

The viewport SCC 2114 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 2116 stage.

The rasterization 2116 stage converts the 3D geometric primitives into 2D fragments (e.g. capable of being utilized for display, etc.). The rasterization 2116 stage may be configured to utilize the vertices of the geometric primitives to setup a set of plane equations from which various attributes can be interpolated. The rasterization 2116 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 2116 stage generates fragment data (e.g., interpolated vertex attributes associated with a particular sample location for each covered pixel) that are transmitted to the fragment shading 2118 stage.

The fragment shading 2118 stage processes fragment data by performing a set of operations (e.g., a fragment shader or a program) on each of the fragments. The fragment shading 2118 stage may generate pixel data (e.g., color values) for the fragment such as by performing lighting operations or sampling texture maps using interpolated texture coordinates for the fragment. The fragment shading 2118 stage generates pixel data that is transmitted to the raster operations 2120 stage.

The raster operations 2120 stage may perform various operations on the pixel data such as performing alpha tests, stencil tests, and blending the pixel data with other pixel data corresponding to other fragments associated with the pixel. When the raster operations 2120 stage has finished processing the pixel data (e.g., the output data 2104), the pixel data may be written to a render target such as a frame buffer, a color buffer, or the like.

It will be appreciated that one or more additional stages may be included in the graphics processing pipeline 2100 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 2112 stage). Other types of graphics processing pipelines are contemplated as being within the scope of the present disclosure. Furthermore, any of the stages of the graphics processing pipeline 2100 may be implemented by one or more dedicated hardware units within a graphics processor such as parallel processing unit 1520. Other stages of the graphics processing pipeline 2100 may be implemented by programmable hardware units such as the streaming multiprocessor 1800 of the parallel processing unit 1520.

The graphics processing pipeline 2100 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1520. The API provides an abstraction for a programmer that lets a programmer utilize specialized graphics hardware, such as the parallel processing unit 1520, to generate the graphical data without requiring the programmer to utilize the specific instruction set for the parallel processing unit 1520. The application may include an API call that is routed to the device driver for the parallel processing unit 1520. The device driver interprets the API call and performs various operations to respond to the API call. In some instances, the device driver may perform operations by executing instructions on the CPU. In other instances, the device driver may perform operations, at least in part, by launching operations on the parallel processing unit 1520 utilizing an input/output interface between the CPU and the parallel processing unit 1520. In an embodiment, the device driver is configured to implement the graphics processing pipeline 2100 utilizing the hardware of the parallel processing unit 1520.

Various programs may be executed within the parallel processing unit 1520 in order to implement the various stages of the graphics processing pipeline 2100. For example, the device driver may launch a kernel on the parallel processing unit 1520 to perform the vertex shading 2108 stage on one streaming multiprocessor 1800 (or multiple streaming multiprocessor 1800 modules). The device driver (or the initial kernel executed by the parallel processing unit 1520) may also launch other kernels on the parallel processing unit 1520 to perform other stages of the graphics processing pipeline 2100, such as the geometry shading 2112 stage and the fragment shading 2118 stage. In addition, some of the stages of the graphics processing pipeline 2100 may be implemented on fixed unit hardware such as a rasterizer or a data assembler implemented within the parallel processing unit 1520. It will be appreciated that results from one kernel may be processed by one or more intervening fixed function hardware units before being processed by a subsequent kernel on a streaming multiprocessor 1800.

LISTING OF DRAWING ELEMENTS 100 robotic grasper path planning system
102 storage system
104 deformable object models
106 classifier
108 robotic grasper model
110 physics simulator
112 grasp performance metrics
114 path planner
116 grasping models
118 robotic grasp features
120 robotic grasp features
122 manipulation constraints
124 robotic grasper
126 grasp performance metrics
128 comparator
200 process
202 block
204 block
206 block
208 block
210 block
300 process
302 block
304 block
306 block
308 block
400 process
402 block
404 block
406 block
408 block
410 block
412 block
602 line representation
1502 I/O unit
1504 front-end unit
1506 hub
1508 scheduler unit
1510 work distribution unit
1512 memory
1514 crossbar
1516 NVLink
1518 interconnect
1520 parallel processing unit
1600 general processing cluster
1602 pipeline manager
1604 pre-raster operations unit
1606 data processing cluster
1608 raster engine
1610 M-pipe controller
1612 primitive engine
1614 work distribution crossbar
1616 memory management unit
1700 memory partition unit
1702 raster operations unit
1704 level two cache
1706 memory interface
1800 streaming multiprocessor 1802 instruction cache
1804 scheduler unit
1806 dispatch
1808 register file
1810 core
1812 special function unit
1814 load/store unit
1816 interconnect network
1818 shared memory/L1 cache
1900 processing system
1902 parallel processing module
1904 switch
1906 central processing unit
2000 exemplary processing system
2002 main memory
2004 network interface
2006 display devices
2008 input devices
2010 communications bus
2100 graphics processing pipeline
2102 input data
2104 output data
2106 data assembly
2108 vertex shading
2110 primitive assembly
2112 geometry shading
2114 viewport SCC
2116 rasterization
2118 fragment shading
2120 raster operations Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method for determining the position, motion, and force settings for a robotic manipulator, the method comprising:
   classifying a deformable object model as one of a fully solid object model, ring-like object model, open container object model, and hollow object model;
   for at least one grasping model of a plurality of candidate grasping models of the deformable object:
      generating a simulation of a response of the deformable object to the grasping model, the simulation comprising:
      initializing the deformable object model at rest atop a horizontal plane;
      disabling collisions with the horizontal plane;
      generating a set of candidate grasps on an aligned bounding box; and
      recording pre-contact nodal positions and element stresses of the deformable object model;
         obtaining, from the simulation, grasp performance metrics for stress, deformation controllability, and instability of the response to the grasping model; and
         correlating the grasp performance metrics with robotic grasping features of the robotic manipulator;
      identifying a conforming model of the grasping models, the conforming model comprising robotic grasp features of the robotic manipulator that meet manipulation constraints of the deformable object; and
      operating a robotic manipulator path planner to transform the robotic grasp features into the position, motion, and force settings for the robotic manipulator.

2. The method of claim 1, wherein the grasp performance metrics further comprise grasp success, strain energy, and linear and angular instability.

3. The method of claim 1, wherein the robotic grasp features comprise pure distance, perpendicular distance, number of contacts, edge distance, squeeze distance, robotic grasper separation, and gravity alignment.

4. The method of claim 1, wherein the simulation comprises Finite Element Simulation.

5. The method of claim 1, wherein the simulation comprises a co-rotational linear constitutive model of the deformable object's internal dynamics coupled to a rigid body representation of the robotic grasper.

6. The method of claim 5, wherein the internal dynamics are coupled to the rigid body representation via an isotropic Coulomb contact model.

7. The method of claim 1, wherein the grasp performance metrics are derived from element stress tensors and nodal positions for a mesh representation of the deformable object returned by the simulation at different time steps.

8. The method of claim 1, further comprising:
   initializing a simulated robotic grasper to one of the candidate grasps;
   generating a squeezing force on the deformable object model by the simulated robotic grasper; and
   simulating the grasping of the deformable object by applying, to the deformable object model by the simulated robotic grasper, a force-based torque controller, with a low-pass filter applied to contact forces to mitigate numerical fluctuations.

9. The method of claim 1, further comprising:
   lowering the horizontal plane to apply incremental gravitational loading to the deformable object model;
   assigning a pickup success attribute to the grasping model on condition that contact is maintained between the deformable object model and the plane for a configured time; and
   on condition of assignment of the pickup success attribute to the grasping model, recording stress and deformation fields for the deformable object model, and computing the stress, deformation, and strain energy metrics for the deformable object model.

10. The method of claim 1, further comprising:
    increasing the squeezing force a simulated robotic grasper on the deformable object model over a configured range, up to a maximum force required to counteract rotational slip of the deformable object model;
    wherein the maximum force is estimated by approximating each contact patch of the simulated robotic grasper as a number of point-contacts that oppose a moment induced by gravity;
    rotating the deformable object model around a configured number of vectors at configured angles; and
    recording stress and deformation fields of the deformable object model for each vector, and computing a deformation controllability metric as a maximum deformation over states achieved through the vectors.

11. A computing apparatus comprising:
    at least one processor; and
    a memory storing instructions that, when executed by the at least one processor, configure the apparatus to:
       generate a simulation of a response of a deformable object model to a grasping model for a robotic manipulator;
       obtain, from the simulation, a metric of instability under deformation of the response of the deformable object to the grasping model, the simulation comprising increasing a squeezing force on the deformable object model over a configured range, up to a maximum force required to counteract rotational slip of the deformable object model in a simulated robotic grasper, wherein the maximum force is estimated by approximating one or more contact patch of the simulated robotic grasper as a number of point-contacts that oppose a moment induced by gravity, and rotating the deformable object model around a plurality of vectors at a plurality of angles;
       correlate the metric of instability under deformation with robotic grasp features; and
       transform the robotic grasp features through a path planner to generate control settings for the robotic manipulator.

12. The apparatus of claim 11, the memory further storing instructions that, when executed by the at least one processor, configure the apparatus to:

obtain, from the simulation, metrics for stress and deformation controllability of the response to the grasping model.

13. The apparatus of claim 12, wherein the metrics obtained from the simulation of the response further comprise grasp success, strain energy, and linear and angular instability.

14. The apparatus of claim 13, wherein the robotic grasp features comprise pure distance, perpendicular distance, number of contacts, edge distance, squeeze distance, robotic grasper separation, and gravity alignment.

15. The apparatus of claim 11, the memory further storing instructions that, when executed by the at least one processor, configure the apparatus to:
    select the deformable object model from a set of object models classified as solid object models, ring-like object models, open container object models, and hollow object models.

16. The apparatus of claim 12, wherein the simulation comprises a co-rotational linear constitutive model of the deformable object's internal dynamics coupled to a rigid body representation of the robotic grasper.

17. The apparatus of claim 11, the memory further storing instructions that, when executed by the at least one processor, configure the apparatus to:
    lower a simulated horizontal plane to apply incremental gravitational loading to the deformable object model in the simulation;
    assign a pickup success attribute to the grasping model on condition that contact is broken between the deformable object model and the horizontal plane for a configured time; and
    on condition of assignment of the pickup success attribute to the grasping model, record stress and deformation fields for the deformable object model, and compute the stress, deformation, and strain energy metrics for the deformable object model.

18. A system for configuring a controller for a robotic manipulator, the system comprising:
    a plurality of deformable object models;
    a physics simulator;
    a robotic manipulator path planner; and
    logic to:
        operate the physics simulator on a deformable object model of the deformable object models to generate a simulation of a response of the deformable object model to a grasping model for the robotic manipulator, the simulation comprising:
        increasing the squeezing force a simulated robotic grasper on the deformable object model over a configured range, up to a maximum force required to counteract rotational slip of the deformable object model;
        wherein the maximum force is estimated by approximating each contact patch of the simulated robotic grasper as a number of point-contacts that oppose a moment induced by gravity;
        rotating the deformable object model around a configured number of vectors at configured angles; and
        recording stress and deformation fields of the deformable object model for each vector, and computing a deformation controllability metric as a maximum deformation over states achieved through the vectors;
        obtain, from the simulation, a metrics for instability under deformation of the response to the grasping model;
        determine whether the grasping model comprises robotic grasp features that correlate with manipulation constraints of the deformable object; and
        on condition that the robotic grasp features correlate with the manipulation constraints, apply the robotic grasp features to the path planner to generate motion, position, and force settings for the robotic manipulator.

* * * * *